United States Patent
Ballard et al.

(10) Patent No.: US 10,045,144 B2
(45) Date of Patent: Aug. 7, 2018

(54) REDIRECTING AUDIO OUTPUT

(71) Applicant: Microsoft Technology Licensing, LLC, Redmond, WA (US)

(72) Inventors: Jeffrey Ryan Ballard, Carnation, WA (US); Robert L. Ridihalgh, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/399,624

(22) Filed: Jan. 5, 2017

(65) Prior Publication Data
US 2017/0171685 A1    Jun. 15, 2017

Related U.S. Application Data

(63) Continuation-in-part of application No. 14/964,390, filed on Dec. 9, 2015.

(51) Int. Cl.
*G06F 17/00* (2006.01)
*H04S 7/00* (2006.01)
(Continued)

(52) U.S. Cl.
CPC .............. *H04S 7/303* (2013.01); *A63F 13/54* (2014.09); *G06T 17/20* (2013.01); *H04S 2400/11* (2013.01)

(58) Field of Classification Search
CPC ...... H04S 7/303; H04S 2400/11; A63F 13/54; A63F 13/57
See application file for complete search history.

(56) References Cited

U.S. PATENT DOCUMENTS 5,315,512 A    5/1994 Roth
5,995,447 A    11/1999 Mandal et al.
(Continued)

FOREIGN PATENT DOCUMENTS

CN    102665156 A    9/2013
EP    2552130 A1    1/2013
(Continued)

OTHER PUBLICATIONS

Non-Final Office Action Issued in U.S. Appl. No. 14/964,390, dated Aug. 10, 2017, 18 Pages.
(Continued)

*Primary Examiner* — Andrew C Flanders
(74) *Attorney, Agent, or Firm* — Alleman Hall Creasman & Tuttle LLP

(57) ABSTRACT

A method for providing directional audio in a computer environment includes recognizing a location of a listener in the computer environment, recognizing a location of a sound emitter in the computer environment, and recognizing a plurality of candidate portal points in the computer environment. Each candidate portal point provides a viable audio path from the location of the sound emitter to the location of the listener. The method further includes identifying a selected portal point from among the plurality of candidate portal points based at least on a first distance from the selected portal point to the location of the listener and a second distance from the selected portal point to the location of the sound emitter and setting a perceived direction of the sound emitter to go through a location of the selected portal point.

20 Claims, 19 Drawing Sheets

(51) Int. Cl.
*G06T 17/20* (2006.01)
*A63F 13/54* (2014.01)

(56) References Cited

U.S. PATENT DOCUMENTS

| | | | |
|---|---|---|---|
| 6,917,686 | B2 | 7/2005 | Jot et al. |
| 8,525,834 | B2 | 9/2013 | Salemann |
| 8,587,583 | B2 | 11/2013 | Newcombe et al. |
| 8,767,968 | B2 | 7/2014 | Flaks et al. |
| 9,202,509 | B2 | 12/2015 | Kallai et al. |
| 2003/0107478 | A1 | 6/2003 | Hendricks et al. |
| 2006/0153391 | A1 | 7/2006 | Hooley et al. |
| 2007/0121955 | A1 | 5/2007 | Johnston et al. |
| 2008/0183077 | A1 | 7/2008 | Moreau-Gobard et al. |
| 2008/0205667 | A1 | 8/2008 | Bharitkar et al. |
| 2008/0232602 | A1 | 9/2008 | Shearer |
| 2010/0020951 | A1 | 1/2010 | Basart et al. |
| 2010/0156901 | A1 | 6/2010 | Park et al. |
| 2011/0081023 | A1 | 4/2011 | Raghuvanshi et al. |
| 2011/0149680 | A1 | 6/2011 | Oishi |
| 2011/0254842 | A1 | 10/2011 | Dmitrieva et al. |
| 2011/0317522 | A1 | 12/2011 | Florencio et al. |
| 2012/0014551 | A1 | 1/2012 | Ohashi et al. |
| 2012/0093320 | A1 | 4/2012 | Flaks et al. |
| 2012/0113224 | A1 | 5/2012 | Nguyen et al. |
| 2012/0179041 | A1 | 7/2012 | Nakagawa |
| 2012/0213375 | A1 | 8/2012 | Mahabub et al. |
| 2012/0215530 | A1 | 8/2012 | Harsch |
| 2012/0288124 | A1 | 11/2012 | Fejzo et al. |
| 2013/0170647 | A1 | 7/2013 | Reilly et al. |
| 2013/0249914 | A1 | 9/2013 | Ignatoff |
| 2014/0342823 | A1 | 11/2014 | Kapulkin et al. |
| 2015/0016642 | A1 | 1/2015 | Walsh et al. |
| 2015/0063572 | A1 | 3/2015 | Gleim |
| 2015/0139439 | A1 | 5/2015 | Norris et al. |
| 2015/0378019 | A1 | 12/2015 | Schissler et al. |
| 2015/0382128 | A1 | 12/2015 | Ridihalgh et al. |
| 2016/0196108 | A1 | 7/2016 | Selig et al. |

FOREIGN PATENT DOCUMENTS

| | | |
|---|---|---|
| SE | 470579 B | 9/1994 |
| WO | 2014146668 A2 | 9/2014 |

OTHER PUBLICATIONS

Soderberg, Martin, "Enhancing the Audio Environment in Virtual City Scenes", In Master Thesis, D-Level, Malardalen University, Sweden, Jun. 11, 2008, pp. 1-30.

Song, M. et al., "Enhancing Loudspeaker-based 3D Audio with Room Modeling", In Proceedings of IEEE International Workshop on Multimedia Signal Processing (MMSP), Oct. 4, 2010, Saint-Malo, France, 6 pages.

Griesinger, D., "Loudspeaker and listener positions for optimal low-frequency spatial reproduction in listening rooms", In Journal of the Acoustical Society of America, vol. 117, Issue 4, Apr. 2005, 21 pages.

Röber, N. et al., "Ray Acoustics Using Computer Graphics Technology", In Proceedings of the 10th International Conference on Digital Audio Effects (DAFx-07), Sep. 10, 2007, Bordeaux, France, 8 pages.

Taylor, M. et al., "Interactive Geometric Sound Propagation and Rendering", Available at https://software.intel.com/sites/default/files/m/d/4/1/d/8/InteractiveGe-ometricSoundPropagationandRendering.pdf, Jun. 24, 2010, 16 pages.

Zimmermann, B. et al., "FPGA-based Real-Time Acoustic Camera Prototype", In Proceedings of the International Symposium on Circuits and Systems, May 30, 2010, Paris, France, 4 pages.

Huang, P. et al., "SPREAD: Sound Propagation and Perception for Autonomous Agents in Dynamic Environments," In Proceedings of the 12th ACM Siggraph/Eurographics Symposium on Computer Animation (SCA '13), Jul. 19, 2013, Anaheim, California, 11 pages.

Filion, D., "Potentially Audible Sets", Chapter 6.4 in: Game Programming Gems 6, Mar. 7, 2006, 13 pages.

Raghuvanshi, N. et al., "Efficient and Accurate Sound Propagation Using Adaptive Rectangular Decomposition", in IEEE Transactions on Visualization and Computer Graphics, vol. 15, Issue 5, Sep. 2009, Paper first published online Feb. 4, 2009, 13 pages.

Haumont, D. et al., "Volumetric cell-and-portal generation", In Computer Graphics Forum, Eurographics 2003 Conference Proceedings, vol. 22, No. 3, Sep. 1, 2003, 10 pages.

Upson, C. et al., "V-BUFFER: Visible Volume Rendering," Computer Graphics, ACM, vol. 22, No. 4, Proceedings of Siggraph '88, Aug. 1, 1988, Atlanta, 6 pages.

ISA European Patent Office, International Search Report and Written Opinion issue in PCT Application No. PCT/US2016/062986, Feb. 28, 2017, WIPO, 13 pages.

Ondet, A. et al., "Modeling of sound propagation in fitted workshops using ray tracing", In Journal of Acoustical Society of America, vol. 85, Issue 2, Accepted for publication Sep. 29, 1988, Published online Jun. 1998, 11 pages.

IPEA European Patent Office, Second Written Opinion Issued in PCT Application No. PCT/US2016/062986, Jun. 20, 2017, WIPO, 4 pages.

"International Search Report & Written Opinion Issued in PCT Application No. PCT/US2017/068843", dated Mar. 23, 2018, 13 Pages.

"International Search Report and Written Opinion Issued in PCT Application No. PCT/US2017/068848", dated Mar. 28, 2018, 16 Pages.

FIG. 2

| 10.5 | 9.5 | 8.5 | 8.1 | 7.7 | 7.2 | 6.8 | 6.4 | 6.0 | x | 17.7 | 18.1 |
|---|---|---|---|---|---|---|---|---|---|---|---|
| 10.1 | 9.1 | 8.1 | 7.1 | 6.7 | 6.2 | 5.8 | 5.4 | 5.0 | x | 16.7 | 17.1 |
| 9.7 | 8.7 | 7.7 | 6.7 | 5.7 | 5.2 | 4.8 | 4.4 | 4.0 | x | 15.7 | 16.1 |
| 9.2 | 8.2 | 7.2 | 6.2 | 5.2 | 4.2 | 3.8 | 3.4 | 3.0 | x | 14.7 | 15.1 |
| 8.8 | 7.8 | 6.8 | 5.8 | 4.8 | 3.8 | 2.8 | 2.4 | 2.0 | x | 13.7 | 14.1 |
| 8.4 | 7.4 | 6.4 | 5.4 | 4.4 | 3.4 | 2.4 | 1.4 | 1.0 | x | 12.7 | 13.1 |
| 8.0 | 7.0 | 6.0 | 5.0 | 4.0 | 3.0 | 2.0 | 1.0 | L | x | 11.7 | 12.1 |
| 8.4 | 7.4 | 6.4 | 5.4 | 4.4 | 3.4 | 2.4 | 1.4 | 1.0 | x | 10.7 | 11.1 |
| 8.8 | 7.8 | 6.8 | 5.8 | 4.8 | 3.8 | 2.8 | 2.4 | 2.0 | x | 9.7 | 10.1 |
| x | x | x | x | x | x | 3.8 | x | x | x | 8.7 | 9.7 |
| 10.2 | 9.2 | 8.2 | 7.2 | 6.2 | 5.2 | 4.8 | 5.2 | 6.2 | 7.2 | 8.2 | 9.2 |
| 10.7 | 9.7 | 8.7 | 7.7 | 6.7 | 6.2 | 5.8 | 6.2 | 6.7 | 7.7 | 8.7 | 9.7 |

FIG. 3

| 19.7 | 19.3 | 18.9 | 18.5 | 18.1 | 17.7 | 17.2 | 17.7 | 18.1 | x | 6.4 | 6.0 |
| 18.7 | 18.3 | 17.9 | 17.5 | 17.1 | 16.7 | 16.2 | 16.7 | 17.1 | x | 5.4 | 5.0 |
| 17.7 | 17.3 | 16.9 | 16.5 | 16.1 | 15.7 | 15.2 | 15.7 | 16.1 | x | 4.4 | 4.0 |
| 16.7 | 16.3 | 15.9 | 15.5 | 15.1 | 14.7 | 14.2 | 14.7 | 15.1 | x | 3.4 | 3.0 |
| 16.3 | 15.3 | 14.9 | 14.5 | 14.1 | 13.7 | 13.2 | 13.7 | 14.1 | x | 2.4 | 2.0 |
| 15.9 | 14.9 | 13.9 | 13.5 | 13.1 | 12.7 | 12.2 | 12.7 | 13.1 | x | 1.4 | 1.0 |
| 15.5 | 14.5 | 13.5 | 12.5 | 12.1 | 11.7 | 11.2 | 11.7 | 12.1 | x | 1.0 | L |
| 15.1 | 14.1 | 13.1 | 12.1 | 11.1 | 10.7 | 10.2 | 10.7 | 11.1 | x | 1.4 | 1.0 |
| 14.7 | 13.7 | 12.7 | 11.7 | 10.7 | 9.7 | 9.2 | 9.7 | 10.7 | x | 2.4 | 2.0 |
| x | x | x | x | x | x | 8.2 | x | x | x | 3.4 | 3.0 |
| 13.8 | 12.8 | 11.8 | 10.8 | 9.8 | 8.8 | 7.8 | 6.8 | 5.8 | 4.8 | 4.4 | 4.0 |

| PP | Combined distance |
|---|---|
| $P_1$ | 2.7 |
| $P_2$ | 2.3 |
| $P_3$ | 3.8 |
| $P_4$ | 3.4 |
| $P_5$ | 4.2 |
| $P_6$ | 3.6 |
| $P_7$ | 4.2 |
| $P_8$ | 3.3 |

REDIRECTING AUDIO OUTPUT

CROSS REFERENCE TO RELATED APPLICATIONS

This application is a continuation-in-part of U.S. patent application Ser. No. 14/964,390, filed Dec. 9, 2015, the entirety of which is hereby incorporated herein by reference.

BACKGROUND

As computer software and hardware have become more powerful and advanced, media environments, such as video game environments, have become richer and more realistic. Graphics, movement of characters and avatars, and the interaction of various visual elements have all become increasingly realistic. Despite the advances in other aspects of media environments, however, providing realistic sound remains extremely difficult and computationally complex. Conventional approaches to simulating realistic sound also typically requires developers to hard code for specific sound environments, which is very human intensive and does not allow for adapting to changes in the media environment and/or new media environments.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are provided for redirecting audio output. One example method for providing directional audio in a computer environment includes recognizing a location of a listener in the computer environment, recognizing a location of a sound emitter in the computer environment, and recognizing a plurality of candidate portal points in the computer environment. Each candidate portal point provides a viable audio path from the location of the sound emitter to the location of the listener. The method further includes identifying a selected portal point from among the plurality of candidate portal points based at least on a first distance from the selected portal point to the location of the listener and a second distance from the selected portal point to the location of the sound emitter and setting a perceived direction of the sound emitter to go through a location of the selected portal point.

BRIEF DESCRIPTION OF THE DRAWINGS

FIG. 2 is a diagram illustrating an example two-dimensional (2D) voxel-based representation of a media environment, the voxel-based representation indicating distance from each clear voxel to a listener location.

FIG. 3 is a diagram illustrating an example 2D voxel-based representation of a media environment, the voxel-based representation indicating distance from each clear voxel to a listener location and an audio path in which the sound travels around an obstruction to reach the listener location.

DETAILED DESCRIPTION

Figure 1:
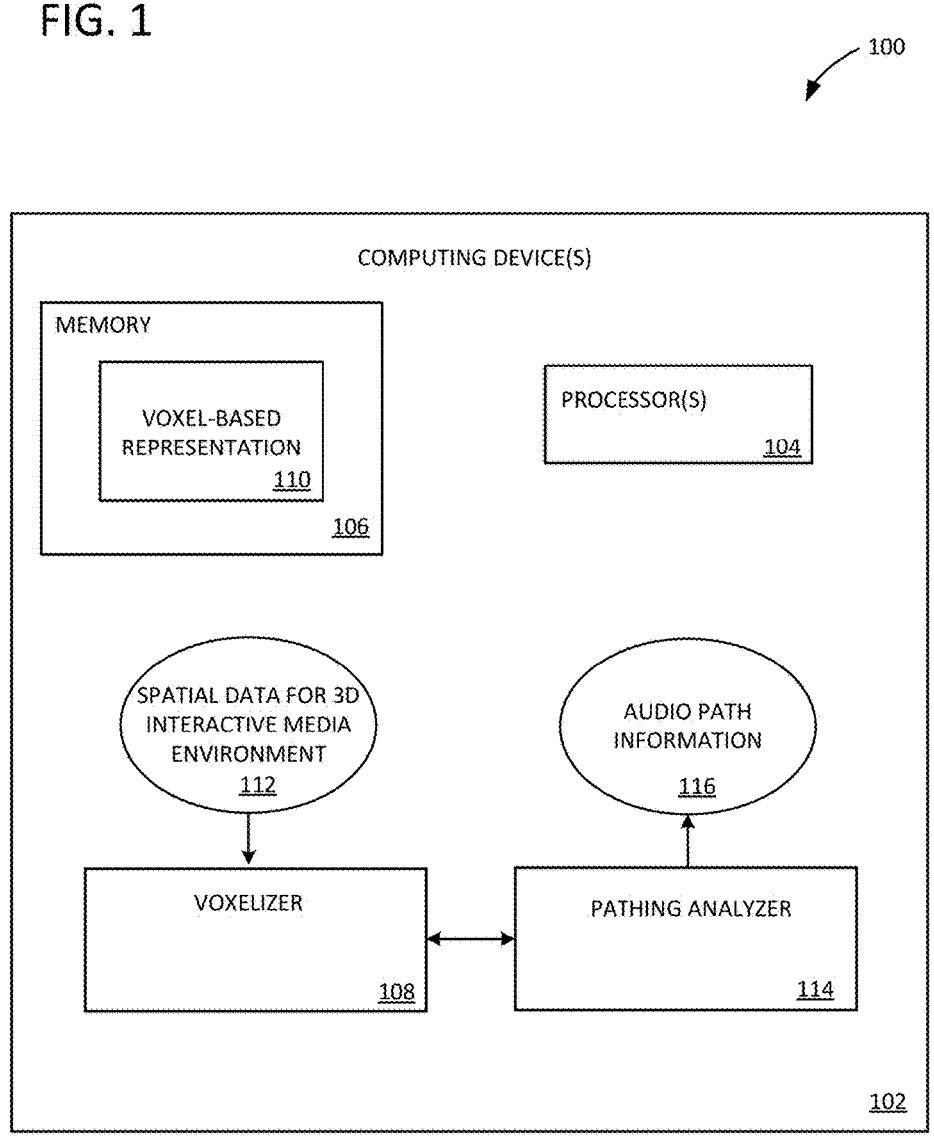
FIG. 1 is a block diagram of an example acoustic adjustment system.

Using the systems, methods, and computer-readable media described herein, acoustics in 3D media environments can be adjusted in real time to accurately reflect the characteristics of the media environment. Unlike conventional attempts to realistically simulate sound in media environments, the described examples allow real-time analysis by using a computationally efficient voxel-based representation of the 3D media environment. The described examples can also account for both the distance sound travels, including indirect paths, as well as reverberation in the listener's immediate area and reverberation in a sound emitter's immediate area, allowing a realistic acoustic simulation.

As an example, in a video game environment, spatial information (e.g., dimensions, locations of visual elements, etc.) representing the video game environment can be used to generate a voxel-based representation of the video game environment in which the volume of the game environment is divided into a number of voxels (e.g., equally sized cubes). The voxel-based representation is a simplified representation of the video game environment that allows for faster and more computationally efficient acoustic propagation calculations. For voxels containing visual elements (also referred to as "geometry") of the video game environment (such as walls, trees, etc.), the voxels can be designated as "blocked" to indicate an obstruction to sound.

A clear-voxel distance, which accounts for obstruction by blocked voxels, can be determined from the locations of sound emitters to the current position of a listener. This clear-voxel distance can be used to adjust the audio generated in the video game environment to more closely correspond to what a listener would actually hear given the locations of the sound emitters and the known obstructions (blocked voxels). For example, if the sound takes an indirect path around obstructions, and the indirect path is twice as far as a direct path (assuming no obstructions were present), some of the high-frequency components of the sound will be disproportionately attenuated by the increased distance as compared to the low-frequency components of the sound.

In a further example, if a direct audio path from a sound emitter to a listener is blocked (e.g., an obstruction such as a wall is present between the sound emitter and the listener), the voxel-based representation of the video game environment may be analyzed to identify one or more voxels through which the sound from the sound emitter may be directed. The identified voxels may provide the shortest indirect path for the sound to be redirected. Such an approach may allow for rapid and efficient audio adjustments that provide realistic audio that adapts to the video game environment, even as the listener, sound emitter, and/or video game environment elements change.

Continuing the above example, the characteristics of the video game environment can also be used to determine reverberation information from the listener's perspective. This can be done, for example, by determining a distance, from the listener, to the nearest blocked voxel in many directions, and in some examples, the type of material and corresponding acoustic properties of the blocked voxels. The locations of blocked voxels inform the way in which sound is reflected around the listener. For example, if a wall in the 3D media environment (represented as blocked voxels) is six inches behind the listener, sound will reverberate differently than if the nearest blocked voxel is 20 feet behind the listener.

In the described examples, the computational complexity of determining audio path information (e.g., distance between sound emitters and the listener), audio redirection, and/or reverberation is reduced through the voxel-based approach, which reduces the amount of processing power, memory, and energy needed to accurately simulate acoustics in the media environment and allows the simulated acoustics to be updated in real time as the location of the listener changes, the locations of sound emitters change, or the geometry of the media environment changes. Examples are described below with reference to FIGS. 1-19.

FIG. 1 illustrates an acoustic adjustment system 100 implemented on one or more computing device(s) 102. Computing device(s) 102 includes processor(s) 104 and a memory 106. A voxelizer 108 is configured to, by processor(s) 104, generate a voxel-based representation 110 of a three-dimensional (3D) interactive media environment. For example, voxelizer 108 can receive spatial information 112 representing the 3D interactive media environment, such as coordinate values demarcating a volume extent of the environment and coordinates or other information indicating the location of visual elements in the environment. Voxelizer 108 can then divide the volume into voxels. As used herein, voxels are volume elements (units of volume) similar to how pixels are two-dimensional (2D) area elements. Voxels can be, for example, cubes of a uniform size. Voxelizer 108 can divide a volume according to different resolutions (i.e., different numbers of voxels per unit of measured volume). The 3D interactive media environment can be, for example, a video game environment, a virtual reality environment, or an augmented reality environment.

Voxel-based representation 110 is a simplified representation of the 3D interactive media environment, and different resolutions allow for more or less accuracy (where a lower resolution results in a lower computational complexity). Voxelizer 108 can be configured to store voxel-based representation 110 in memory 106. Voxelizer 108 can also be configured to identify, by the processor, a plurality of blocked voxels. Blocked voxels are voxels that intersect visual elements of the 3D interactive media environment. Information indicating the location of visual elements can be included in the spatial information 112 and can also be referred to as the "geometry" or "triangles" of the environment. Voxelizer 108 can determine intersections of visual elements with voxels by comparing the locations of the geometry with the extent of the individual voxels. If there is an intersection, voxelizer 108 can designate the entire voxel as blocked.

Blocked voxels can obstruct or occlude sound. As used herein, "obstruction" refers to one or more blocked voxels that prevent at least some sound waves from propagating along a direct path to a listener but still allow an indirect path to the listener. As used herein, "occlusion" refers to a group of blocked voxels that prevent sound from propagating to the listener by either a direct or indirect path. An example of obstruction is a wall of a room with an open door separating a radio playing in the room from a listener standing outside the room. The wall of the room obstructs the most direct path for sound to travel from the radio to the listener (through the wall), but the sound can travel through the door and around to the listener. An example of occlusion is a radio playing inside of safe or other enclosure. In some instances, sound can propagate through a material even though the material blocks or completely encloses the sound. In such examples, a level of obstruction or an amount of occlusion can be determined by the material's audio propagation properties (also referred to as the material's audio "transparency").

A pathing analyzer 114 can be configured to determine, by processor 104 and for respective voxels of the plurality of voxels that are clear voxels, audio path information 116 representing a path of clear voxels between the voxel and a location of the listener. Clear voxels are voxels other than blocked voxels. The path of clear voxels indicates a path of sound, in the 3D interactive media environment, between a location corresponding to the voxel and the location of the listener. The path of clear voxels can be, for example, a shortest clear voxel path. In some examples, pathing analyzer 114 is configured to determine multiple clear voxel paths between individual clear voxels and the location of the listener, and audio path information 116 can represent the multiple paths.

Audio path information 116 can include a length of the path of clear voxels. This is illustrated in FIGS. 2-3. FIG. 2 illustrates an example 2D voxel-based representation 200 of a media environment. FIG. 2 shows a 2D example for ease of illustration, which can be thought of as a volume cross section. In FIG. 2, blocked voxels are denoted with an "X." For clear voxels, a shortest clear-voxel distance to the listener is shown. The listener is located in voxel 202 and is denoted with an "L." The bolded voxels extending from voxel 204 to voxel 202 indicate a shortest clear-voxel path between voxel 204 and voxel 202.

FIG. 3 illustrates another example 2D voxel-based representation 300 of a media environment. As in FIG. 2, in FIG. 3, blocked voxels are denoted with an "X," the listener is denoted with an "L" (in voxel 302), and clear voxels indicate a shortest clear-voxel distance to the listener. In FIG. 3, a number of blocked voxels create an obstruction between voxel 304 and the listener at voxel 302. If the blocked voxels were clear, a shortest path between voxels 304 and 302 would extend horizontally between voxels 304 and 302. Because of the obstruction, the shortest clear voxel path (shown by bolded boxes) is indirect and passes through voxel 306. If voxel 306 were also blocked, then voxel 304 would be occluded from the listener in voxel 302. The path distance shown in each voxel is calculated using the distance between voxel centers in the path. Accordingly, while the distance between a voxel and an adjacent horizontal or vertical voxel is 1.0, the distance between adjacent diagonal voxel centers, such as between voxel 308 and 310, is approximately 1.4 (the square root of two).

Returning to FIG. 1, audio path information 116 can also include an angle from the voxel to the next voxel of the path of clear voxels. In this way, each voxel on the clear voxel path is associated with the angle to the next voxel in the direction of the listener. The angle can be, for example, in the form of an x-direction, y-direction, and z-direction angle component or an x-direction, y-direction, and z-direction distance to the next voxel center.

Pathing analyzer 114 can be further configured to determine a ratio of the length of the path of clear voxels to a shortest distance between the voxel and the location of the listener. The shortest distance corresponds to the length of a line connecting the voxel and the location of the listener. The ratio indicates an audio adjustment that accounts for the length of the path of clear voxels, and can be used to determine an obstruction value. For example, if the clear voxel path is 20, and the shortest (direct, ignoring blocked voxels) path is 10, the ratio is 2:1. This can be converted to an obstruction value through a variety of approaches. In one example, obstruction values of 0.0 result when the ratio is 1:1, and obstruction values of 1.0 result when the ratio is infinity (or very large):1. Occlusion can be indicated with values of 1, for example, if a voxel is occluded, and 0 if the voxel is not occluded.

The length of the acoustic path that audio travels can affect the frequency composition of a received signal as compared to an emitted signal. For example, over long distances, higher frequency components of an audio signal tend to attenuate disproportionately to lower frequency components. Given knowledge of the ratio between the clear voxel path traveled and what a direct path (absent blocked voxels) would have been allows the frequencies of the audio received at the listener location to be adjusted accordingly for realistic simulation.

Pathing analyzer 114 can determine audio path information 116 through, for example, a floodfilling approach in which after a starting voxel is examined, an adjacent voxel is examined, followed by another, etc., until the entire clear voxel space of voxel-based representation 110 has been examined.

Pathing analyzer 114 can store audio path information 116, and an application such as a video game application or virtual reality application can provide locations of sound emitters. The voxel(s) corresponding to the sound emitter can be identified by system 100, and audio path information for the voxel can be accessed, providing a "look up" of audio path information given a location.

Pathing analyzer 114 can perform floodfilling or other approaches to determine audio path information 116 for the respective clear voxels again periodically or upon determining that the 3D interactive media environment has changed, a sound emitter has moved, or the listener has moved. Frequent updates can be performed with limited computing resources because of the computational efficiency of using voxel-based representation 110.

Figure 4:
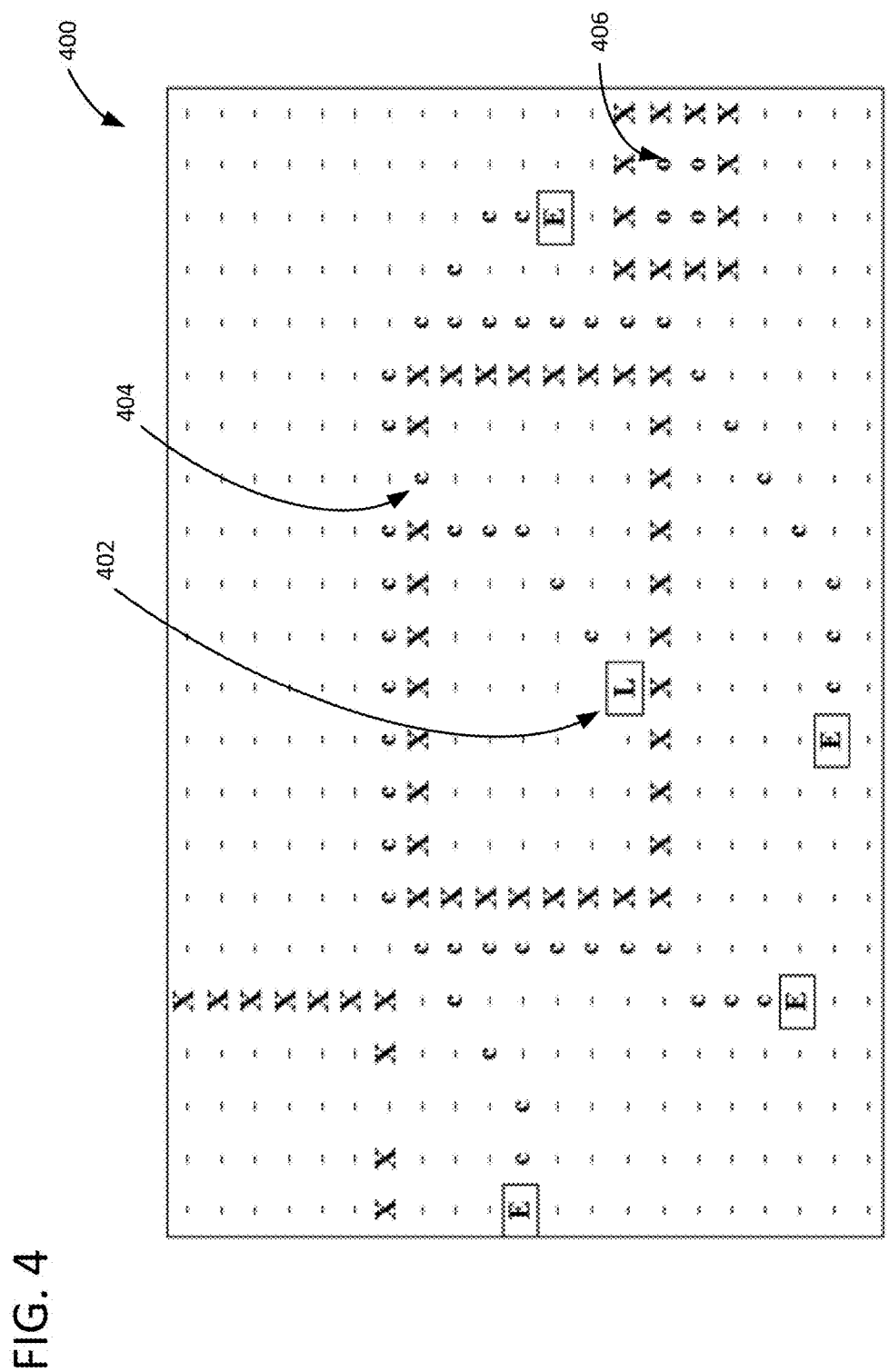
FIG. 4 is a diagram illustrating an example 2D voxel-based representation of a media environment, the voxel-based representation indicating audio paths from sound emitters, around obstructions, to a listener location.
Figure 5:
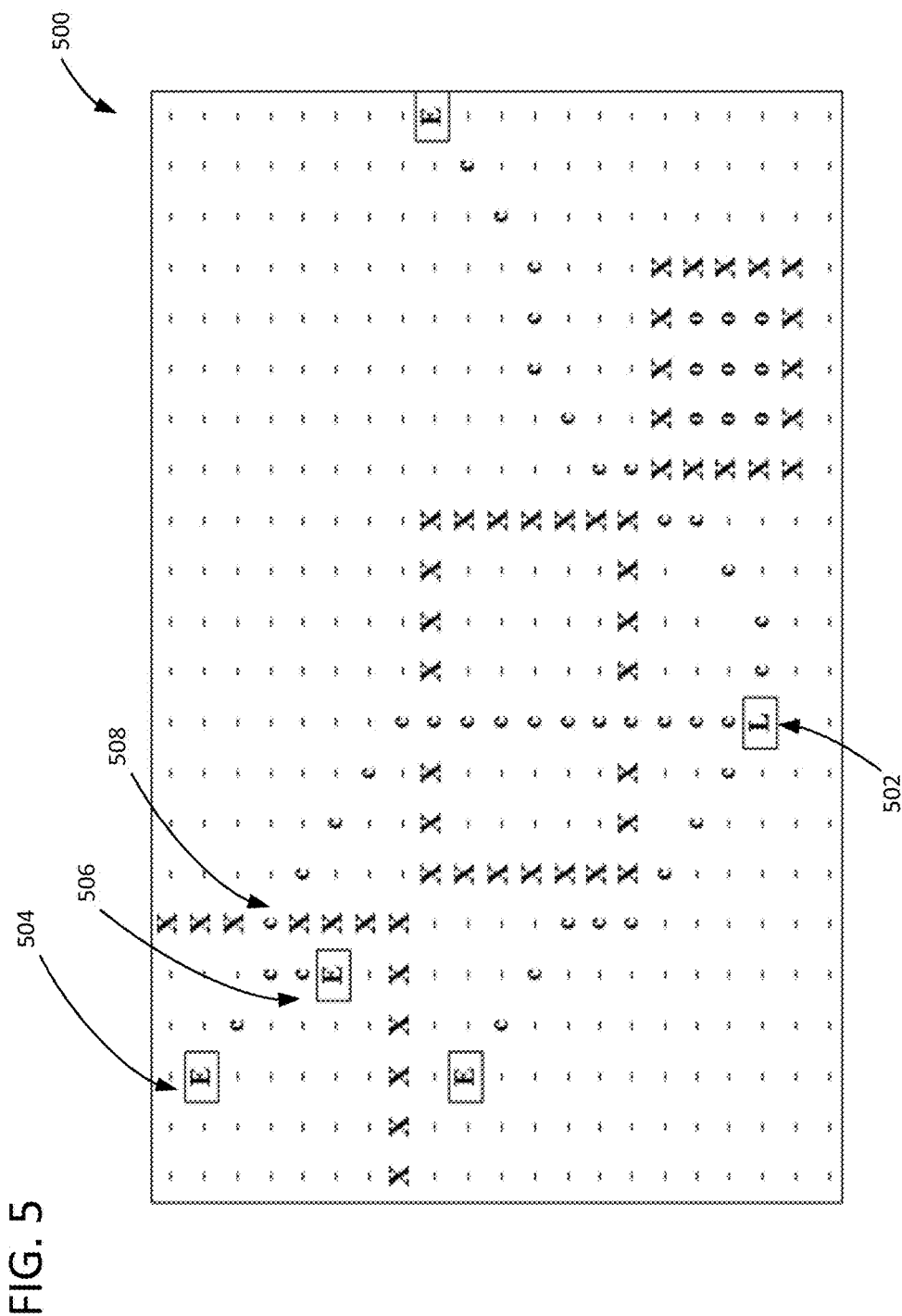
FIG. 5 is a diagram illustrating another example 2D voxel-based representation of a media environment, the voxel-based representation indicating audio paths from sound emitters, around obstructions, to a listener location, where the sound emitter locations and listener locations being different from the diagram of FIG. 4.
Figure 6:
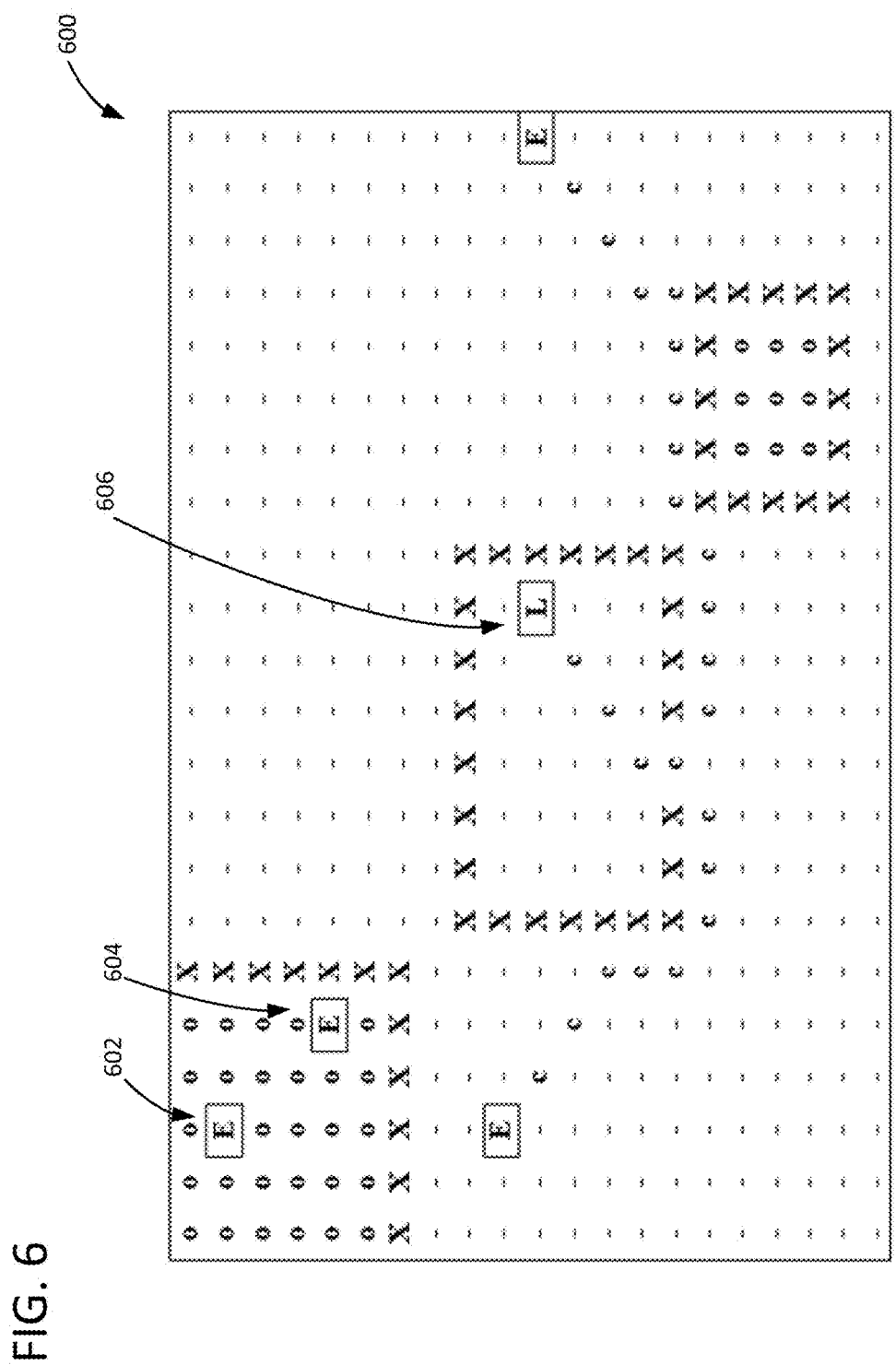
FIG. 6 is a diagram illustrating another example 2D voxel-based representation of a media environment, the voxel-based representation indicating audio paths from sound emitters, around obstructions, to a listener location, where two of the sound emitters are occluded.

FIGS. 4-6 illustrate additional 2D examples in which sound emitters, blocked voxels, and a listener are located. In 2D voxel-based representation 400 of FIG. 4, a listener 402 is mostly surrounded by blocked voxels (denoted by an "X"). Clear voxels are denoted with "-", sound emitters are denoted as "E" surrounded by a box, and voxels along the clear-voxel path from the sound emitters to listener 402 are indicated as "c". The grid framework shown in FIGS. 2 and 3 is omitted for clarity, as are path distances. Because of listener 402's location inside a rectangle of blocked voxels with only one clear voxel, voxel 404, the clear voxel path for each sound emitter passes through voxel 404. Voxel group 406 are occluded voxels, denoted with "o". The occluded voxels are entirely surrounded by blocked voxels, indicating that audio from the sound emitters cannot reach voxel group 406.

FIG. 5 illustrates 2D voxel-based representation 500. As in FIG. 4, "X" indicates blocked voxels, sound emitters are denoted as "E" surrounded by a box, "c" indicates voxels along the clear-voxel path from the sound emitters to listener 502, and occluded voxels are denoted by an "o". In representation 500, sound emitted by both emitters 504 and 506 travels through clear voxel 508 on the clear voxel path to listener 502.

FIG. 6 illustrates 2D voxel-based representation 600. In FIG. 6, sound emitters 602 and 604 are occluded (completely surrounded by blocked voxels), and thus there is no clear voxel path from sound emitters 604 and 602 to listener 606.

Figure 7:
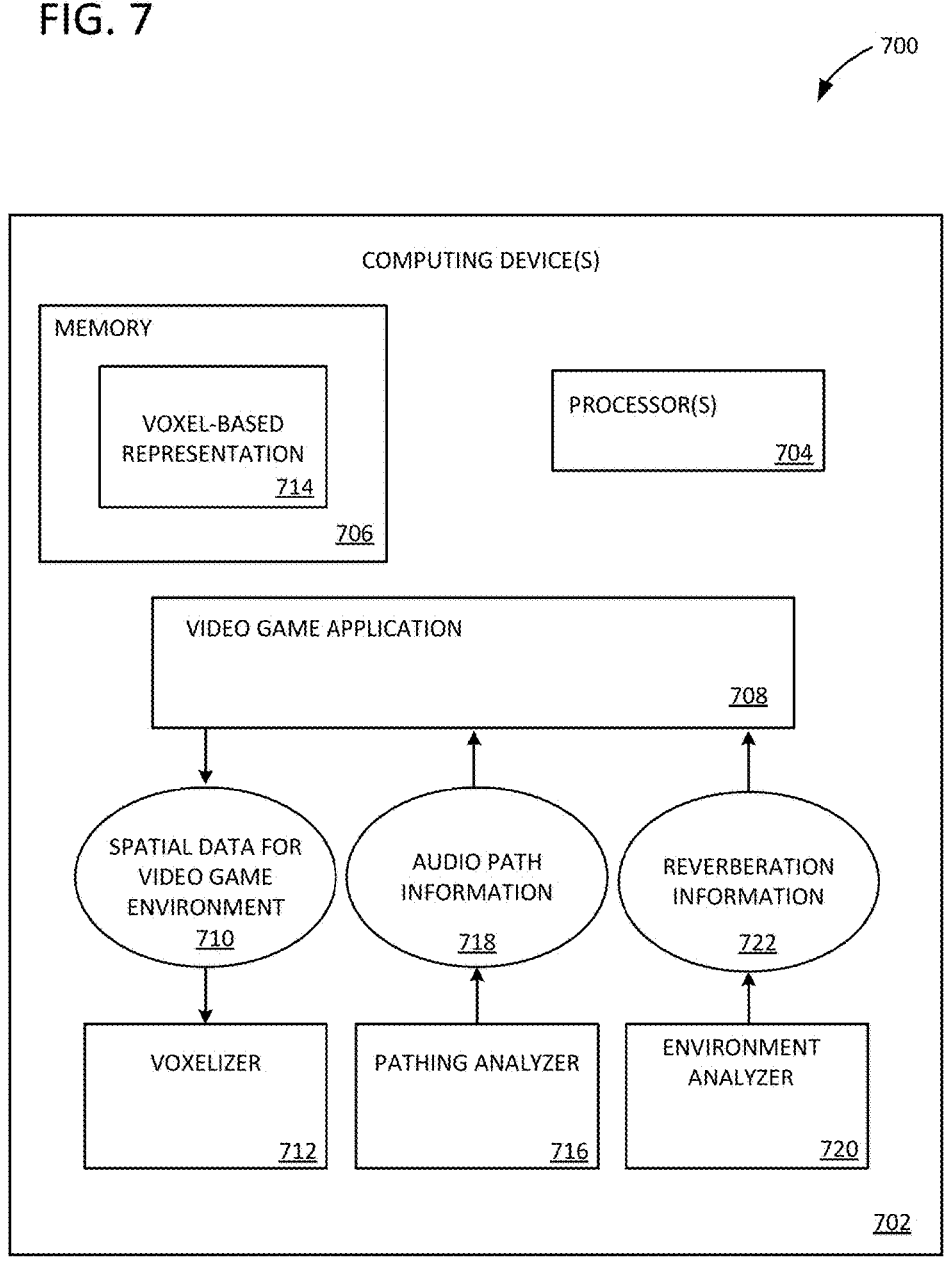
FIG. 7 is a block diagram of an example acoustic adjustment system that includes an environment analyzer.

FIG. 7 illustrates a system 700 implemented on one or more computing device(s) 702. Computing device(s) 702 includes processor(s) 704 and a memory 706. Computing device(s) 702 can be a game console, a desktop computer, laptop computer, mobile device, or other computing device. A video game application 708 is running on computing device 702 and provides spatial data 710 defining a 3D video game environment. A voxelizer 712, which can be similar to voxelizer 108 of FIG. 1, generates a voxel-based representation 714 of the game environment.

A pathing analyzer 716, which can be similar to pathing analyzer 114 of FIG. 1, determines audio path information 718, which can be similar to audio path information 116 of FIG. 1. An environment analyzer 720 is configured to determine, by processor 704, a distance, from the location of a listener, to a blocked voxel in respective directions of a plurality of directions. The distances indicate a sound reverberation adjustment to audio reaching, in the 3D) interactive media environment, the location of the listener. In some examples, the nearest blocked voxel is determined in each of 26 directions from the location of the listener. Other numbers of directions are also contemplated. Environment analyzer 720 provides reverberation information 722 to video game application 708 based at least in part on the distances. Reverberation information 722 can include the distances and can also or alternatively include early reflection values and late reverberation values determined based on the distances.

Environment analyzer 720 can also be configured to determine, by processor 704, a distance, from the location of a sound emitter, to a blocked voxel in respective directions of a plurality of directions. The distances indicate a sound reverberation adjustment to the audio emanating, in the 3D interactive media environment, from the location of the sound emitter. As with the listener location, in some examples, the nearest blocked voxel is determined in each of 26 directions from the location of the sound emitter. Reverberation information 722 can also include the distances and/or early reflection values and late reverberation values for the sound emitter.

In some examples, environment analyzer 720 is further configured to determine, by processor 704, a material type of the blocked voxels in the respective directions. The material type indicates an additional sound reverberation adjustment to audio reaching, in the 3D interactive media environment, the location of the listener. For example, an aluminum surface reflects sound differently than a wood surface, and knowing the material type allows reverberation calculations to be adjusted. Material type information for the geometry of the game (and therefore for the blocked voxels) can be included with the spatial data 710 that defines the 3D video game environment.

In some examples system 700 also includes an audio mixer (not shown) configured to, by processor 704, adjust one or more audio signals that, in the 3D interactive environment, reach the location of the listener, the adjusting based at least in part on the audio path information. The audio mixer can be part of video game application 708 or can be a separate component of system 700.

In some examples, voxelizer 712, pathing analyzer 716, and environment analyzer 720 are implemented as a library, plugin(s), or application(s) accessible to video game application 708 and other applications through an application program interface (API). In such an arrangement, voxelizer 712, pathing analyzer 716, and environment analyzer 720 can be implemented on a computing device, and different video games or virtual reality applications can access them. Pathing analyzer 716 and environment analyzer 720 can be configured to provide different types of output (e.g., clear voxel path distance vs. ratio) depending upon the application interacting with voxelizer 712, pathing analyzer 716, and environment analyzer 720. In some examples, voxelizer 712, pathing analyzer 716, and environment analyzer 720 are part of video game application 708. In some examples, at least one of voxelizer 712, pathing analyzer 716, or environment analyzer 720 are implemented in the cloud and accessible via a cloud-based or local video game application or other application.

Figure 8:
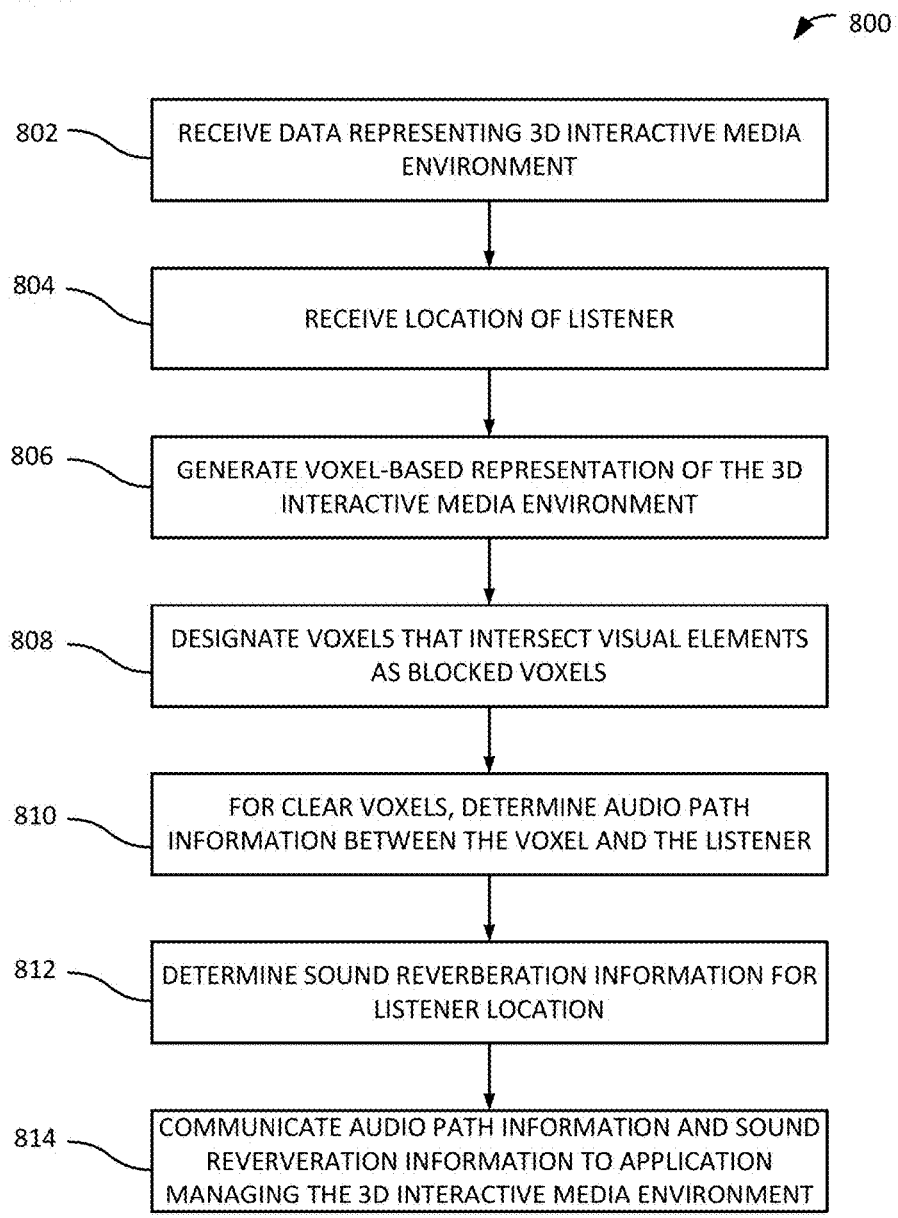
FIG. 8 is a flowchart illustrating an example acoustic adjustment method.

FIG. 8 illustrates a method 800 for acoustic adjustment. In process block 802, data representing a 3D interactive media environment is received. In process block 804, the location of a listener within the 3D interactive media environment is received. In process block 806, based on the data representing the 3D interactive media environment, a voxel-based representation of the 3D interactive media environment is generated. The voxel-based representation can include a plurality of voxels of a uniform size. In process block 808, voxels, of the plurality of voxels, that intersect a visual element of the 3D interactive media environment are designated as blocked voxels.

For respective voxels of the plurality of voxels that are clear voxels, wherein clear voxels are voxels other than blocked voxels, audio path information between the voxel and the location of the listener is determined in process block 810. The audio path information can include clear voxel path distances, ratios of the clear voxel path to a direct path, angles to the next voxel along the clear voxel path, obstruction values, and/or occlusion values. In process block 812, sound reverberation information is determined for the location of the listener. In process block 814, both (i) the audio path information for one or more of the respective clear voxels and (ii) the sound reverberation information are communicated to an application managing the 3D interactive media environment (e.g., a video game or virtual reality application). Method 800 can be performed, for example, by system 100 of FIG. 1 and/or system 700 of FIG. 7.

Figure 9:
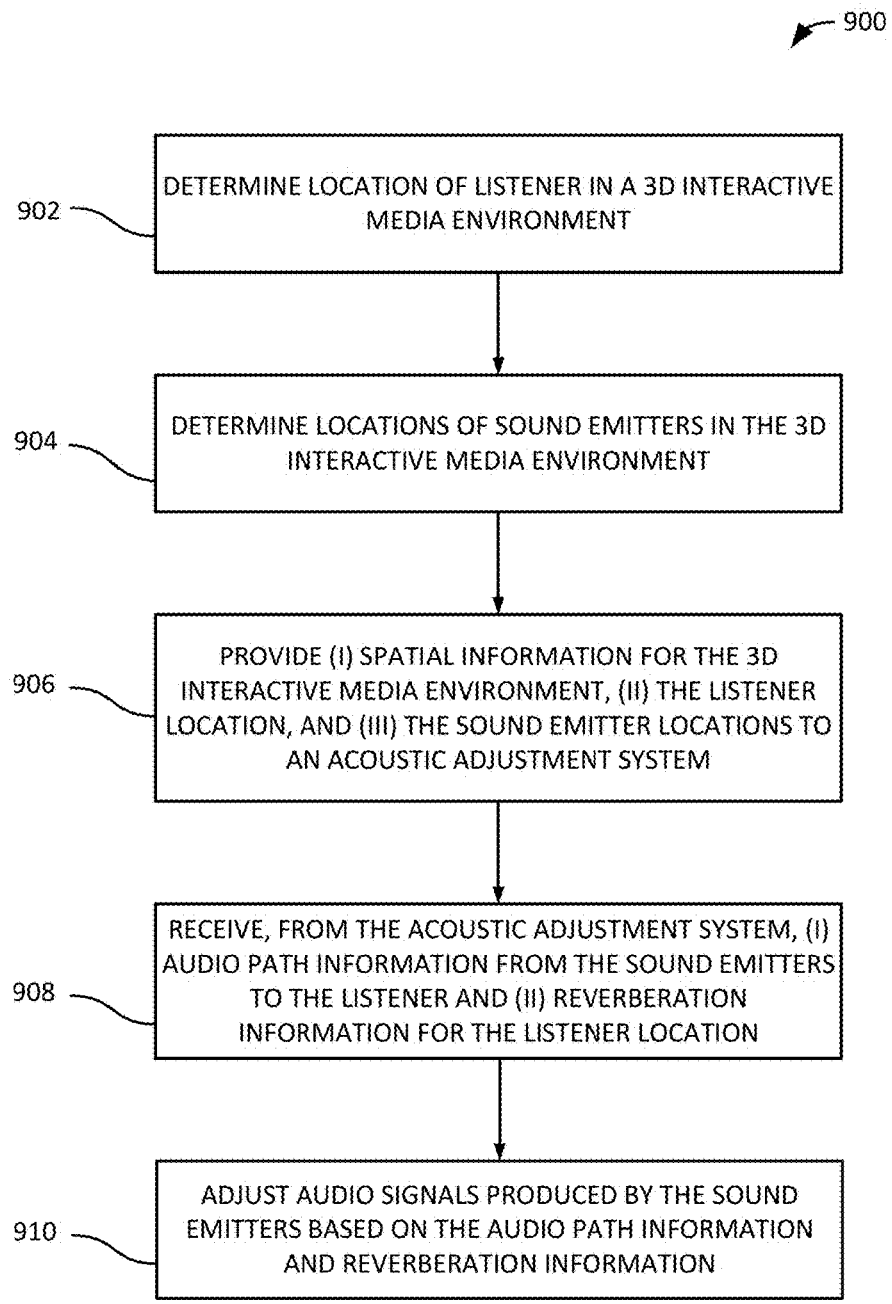
FIG. 9 is a flowchart illustrating an example acoustic adjustment method in which audio signals produced by sound emitters are adjusted.

FIG. 9 illustrates a method 900 for acoustic adjustment. In process block 902, the location of a listener in a three-dimensional (3D) interactive media environment is determined. In process block 904, locations of one or more sound emitters in the 3D interactive media environment are determined. In process block 906, (i) spatial information for the 3D interactive media environment, (ii) the location of the listener, and (iii) the location of the one or more sound emitters are provided to an acoustic adjustment system configured to generate a voxel-based representation of the 3D interactive media environment and analyze the propagation of audio signals within the 3D interactive media environment. The acoustic adjustment system can be similar to, for example, system 100 of FIG. 1 or system 700 of FIG. 7. In process block 908, (i) audio path information from the locations of the one or more sound emitters to the location of the listener and (ii) reverberation information for the location of the listener are received from the acoustic adjustment system. In process block 910, audio signals produced by the one or more sound emitters are adjusted based on the audio path information and the reverberation information. Method 900 can be performed, for example, by a computing device running a video game, virtual reality application, or augmented reality application.

In some examples, a media environment is very large and contains a large amount of empty space. As an example, consider a first-person boat navigating through a largely empty ocean to a distant island. In such examples, different portions of the game volume can be defined over which a voxel-based representation can be created and audio path information, etc., generated, and some portions for which a voxel-based representation is not generated. To continue the above example, the "local" environment around the boat, and perhaps the environment around the distant island, can be voxelized, and audio paths can be determined in accordance with the described approaches, but much of the empty ocean environment is not analyzed (e.g., clear voxel paths are not determined) to save computing power. In such cases, sound reaching the edge of the island environment can be propagated to the local boat environment using a simple straight-line propagation path. In this example, updates performed as the listener moves in the media environment can trigger a redetermination of clear voxel paths for the local environment and distant island environment rather than for the entire environment.

Example Computing Systems

Figure 10:
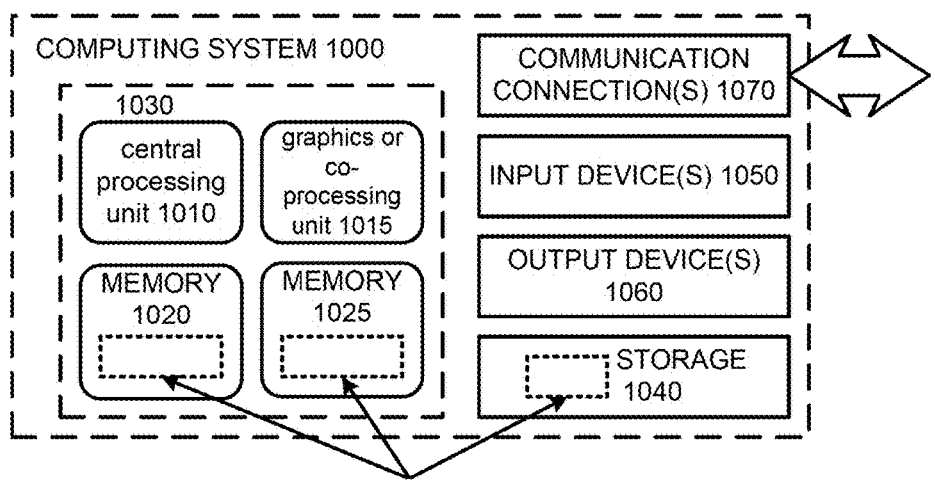
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s). For example, memory 1020, 1025 can store voxelizer 108 and/or pathing analyzer 114 of FIG. 1 and/or voxelizer 712, pathing analyzer 716, and/or environment analyzer 720 of FIG. 7.

A computing system may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information and which can be accessed within the computing system 1000. The storage 1040 stores instructions for the software 1080 implementing one or more innovations described herein. For example, storage 1040 can store voxelizer 108 and/or pathing analyzer 114 of FIG. 1 and/or voxelizer 712, pathing analyzer 716, and/or environment analyzer 720 of FIG. 7.

The input device(s) 1050 may be a touch input device such as a keyboard, mouse, pen, or trackball, a voice input device, a scanning device, or another device that provides input to the computing system 1000. For video encoding, the input device(s) 1050 may be a camera, video card, TV tuner card, or similar device that accepts video input in analog or digital form, or a CD-ROM or CD-RW that reads video samples into the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures. etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Mobile Devices

Figure 11:
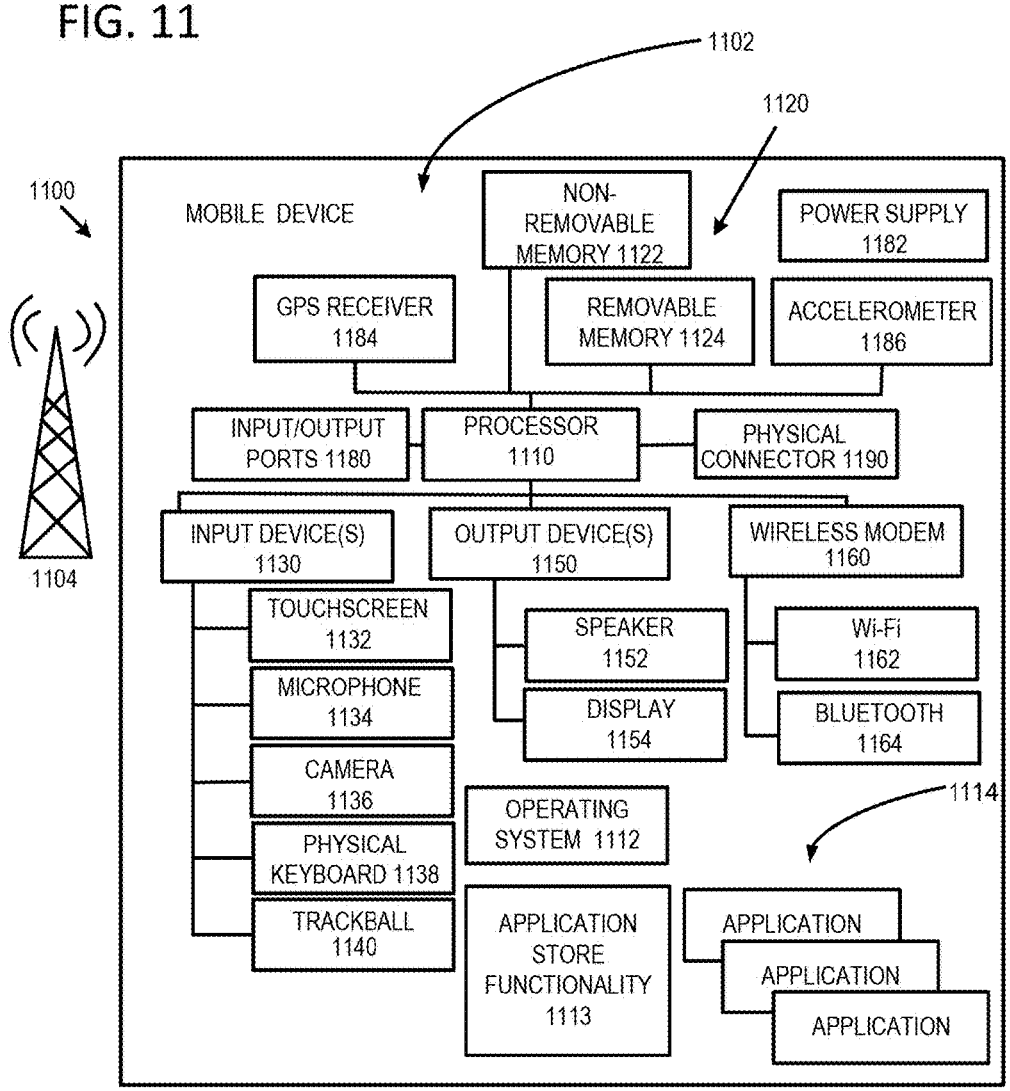
FIG. 11 is an example mobile device that can be used in conjunction with the technologies described herein.

FIG. 11 is a system diagram depicting an example mobile device 1100 including a variety of optional hardware and software components, shown generally at 1102. Any components 1102 in the mobile device can communicate with any other component, although not all connections are shown, for ease of illustration. The mobile device can be any of a variety of computing devices (e.g., cell phone, smart-phone, handheld computer, Personal Digital Assistant (PDA), etc.) and can allow wireless two-way communications with one or more mobile communications networks 1104, such as a cellular, satellite, or other network.

The illustrated mobile device 1100 can include a controller or processor 1110 (e.g., signal processor, microprocessor, ASIC, or other control and processing logic circuitry) for performing such tasks as signal coding, data processing, input/output processing, power control, and/or other functions. An operating system 1112 can control the allocation and usage of the components 1102 and support for one or more application programs 1114. The application programs can include common mobile computing applications (e.g., email applications, calendars, contact managers, web browsers, messaging applications), or any other computing application. The application programs 1114 can also include image recognition technology implemented using convolutional neural networks. Functionality 1113 for accessing an application store can also be used for acquiring and updating application programs 1114.

The illustrated mobile device 1100 can include memory 1120. Memory 1120 can include non-removable memory 1122 and/or removable memory 1124. The non-removable memory 1122 can include RAM, ROM, flash memory, a hard disk, or other well-known memory storage technologies. The removable memory 1124 can include flash memory or a Subscriber Identity Module (SIM) card, which is well known in GSM communication systems, or other well-known memory storage technologies, such as "smart cards." The memory 1120 can be used for storing data and/or code for running the operating system 1112 and the applications 1114. Example data can include web pages, text, images, sound files, video data, or other data sets to be sent to and/or received from one or more network servers or other devices via one or more wired or wireless networks. The memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1100 can support one or more input devices 1130, such as a touchscreen 1132, microphone 1134, camera 1136, physical keyboard 1138 and/or trackball 1140 and one or more output devices 1150, such as a speaker 1152 and a display 1154. Other possible output devices (not shown) can include piezoelectric or other haptic output devices. Some devices can serve more than one input/output function. For example, touchscreen 1132 and display 1154 can be combined in a single input/output device.

The input devices 1130 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1112 or applications 1114 can comprise speech-recognition software as part of a voice user interface that allows a user to operate the device 1100 via voice commands. Further, the device 1100 can comprise input devices and software that allows for user interaction via a user's spatial gestures, such as detecting and interpreting gestures to provide input to a gaming application.

A wireless modem 1160 can be coupled to an antenna (not shown) and can support two-way communications between the processor 1110 and external devices, as is well understood in the art. The modem 1160 is shown generically and can include a cellular modem for communicating with the mobile communication network 1104 and/or other radio-based modems (e.g., Bluetooth 1164 or Wi-Fi 1162). The wireless modem 1160 is typically configured for communication with one or more cellular networks, such as a GSM network for data and voice communications within a single cellular network, between cellular networks, or between the mobile device and a public switched telephone network (PSTN).

The mobile device can further include at least one input/output port 1180, a power supply 1182, a satellite navigation system receiver 1184, such as a Global Positioning System (GPS) receiver, an accelerometer 1186, and/or a physical connector 1190, which can be a USB port, IEEE 1394 (FireWire) port, and/or RS-232 port. The illustrated components 1102 are not required or all-inclusive, as any components can be deleted and other components can be added.

Example Cloud-Supported Environments

Figure 12:
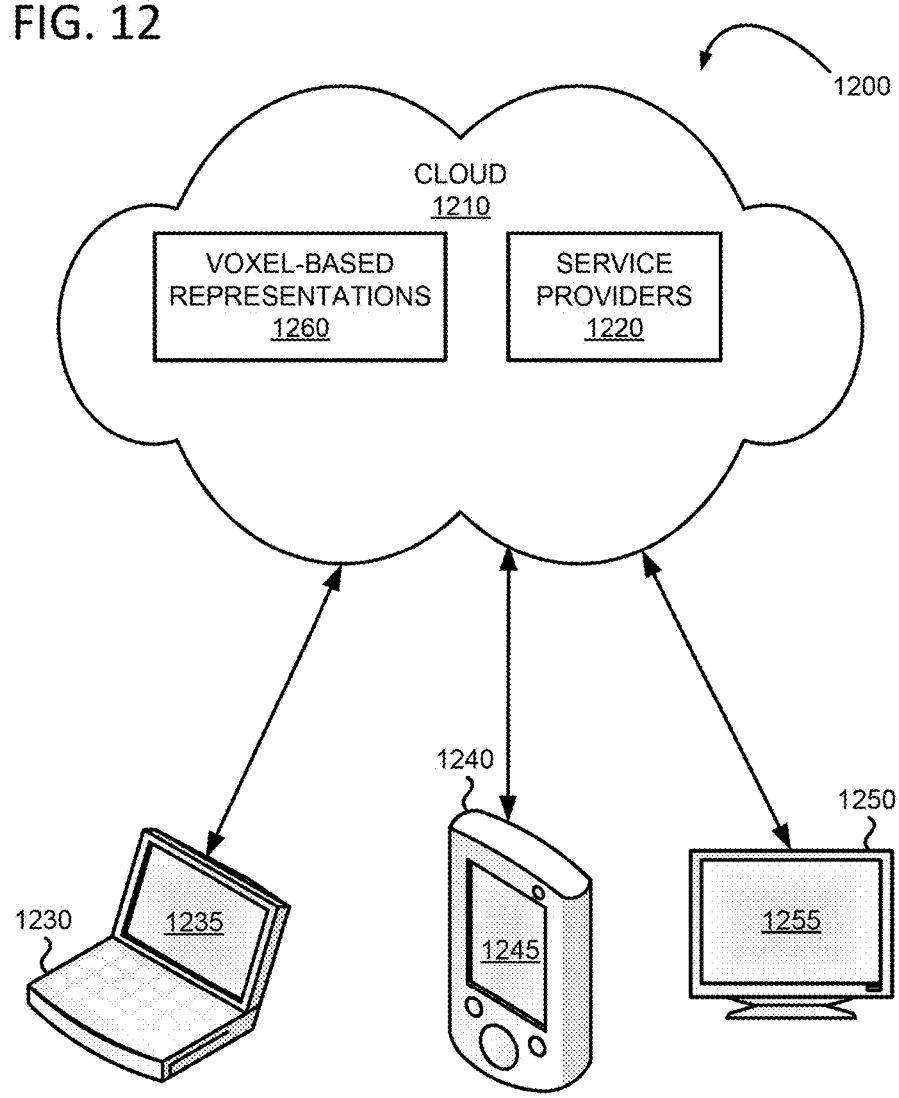
FIG. 12 is an example cloud-supported environment that can be used in conjunction with the technologies described herein.

FIG. 12 illustrates a generalized example of a suitable cloud-supported environment 1200 in which described embodiments, techniques, and technologies may be implemented. In the example environment 1200, various types of services (e.g., computing services) are provided by a cloud 1210. For example, the cloud 1210 can comprise a collection of computing devices, which may be located centrally or distributed, that provide cloud-based services to various types of users and devices connected via a network such as the Internet. The implementation environment 1200 can be used in different ways to accomplish computing tasks. For example, some tasks (e.g., processing user input and presenting a user interface) can be performed on local computing devices (e.g., connected devices 1230, 1240, 1250) while other tasks (e.g., storage of data to be used in subsequent processing) can be performed in the cloud 1210.

In example environment 1200, the cloud 1210 provides services for connected devices 1230, 1240, 1250 with a variety of screen capabilities. Connected device 1230 represents a device with a computer screen 1235 (e.g., a mid-size screen). For example, connected device 1230 can be a personal computer such as desktop computer, laptop, notebook, netbook, or the like. Connected device 1240 represents a device with a mobile device screen 1245 (e.g., a small size screen). For example, connected device 1240 can be a mobile phone, smart phone, personal digital assistant, tablet computer, and the like. Connected device 1250 represents a device with a large screen 1255. For example, connected device 1250 can be a television screen (e.g., a smart television) or another device connected to a television (e.g., a set-top box or gaming console) or the like. One or more of the connected devices 1230, 1240, 1250 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1200. For example, the cloud 1210 can provide services for one or more computers (e.g., server computers) without displays.

Services can be provided by the cloud 1210 through service providers 1220, or through other providers of online services (not depicted). For example, cloud services can be customized to the screen size, display capability, and/or touchscreen capability of a particular connected device (e.g., connected devices 1230, 1240, 1250).

In example environment 1200, the cloud 1210 provides the technologies and solutions described herein to the various connected devices 1230, 1240, 1250 using, at least in part, the service providers 1220. For example, the service providers 1220 can provide a centralized solution for various cloud-based services. The service providers 1220 can manage service subscriptions for users and/or devices (e.g., for the connected devices 1230, 1240, 1250 and/or their respective users). The cloud 1210 can store voxel-based representations 1260 used in acoustic adjustment as described herein.

Thus, as explained above, when audio propagates through the real world, the shape of the environment may alter the perceived characteristics (e.g., directionality, echo, dampening, and/or tone) of the source of the audio. In a real-time computer environment, such as a game, the geometry that forms the virtual world may be assessed for paths that would best represent the direction of a sound, and the audio that is output may be adjusted so that the sound is perceived to travel from the emitter location along the identified direction(s). By identifying open/direct paths from a listener, it is possible to then redirect a portion of audio that is lying in an obstructed path to the nearest relevant opening/unobstructed path. For example, when a sound happens behind a brick wall, it is possible for the audio to instead sound like it is coming from around the wall. As mentioned previously, a clear-voxel distance may be determined from the locations of sound emitters to the current position of a listener and used to redirect the path of the audio.

In another example explained in more detail below with respect to FIGS. 13A-18, a 3D computer environment space may be analyzed to identify a series of points, referred to as "candidate portal points," that provide a slightly obstructed or completely unobstructed path to a central listener point.

Once a sound emitter point is provided, a combined distance of the central listener to the candidate portal point and the distance of the emitter to the candidate portal point is determined. This list of candidate portal points is then sorted by shortest combined distance to find the most realistic sound path(s). In some examples, portal points falling within exclusion zones around the listener and/or emitter locations may be identified and removed from consideration as candidate portal points. One or more candidate portal points that have not been excluded may then be selected based on the combined distance. The selected portal points may be passed on to an audio processor, where the processor may apply relevant filters or perform other audio manipulations (e.g., stereo and/or surround sound channel balancing) such that the sound that is output from the sound emitter has a perceived direction through the selected portal point(s).

In doing so, real-time identification of points in 3D space that allow for clear audio propagation to a listener may be provided. A prioritized list of portal points may be generated based on combined proximity between two points (a listener and emitter). Portal points on the list may be selected for an audio redirection path, for example the highest priority point that falls within a variety of valid areas may be selected and audio emitted from the location of the sound emitter may be filtered or processed such that the audio path passes through the selected portal point.

Figure 13A:
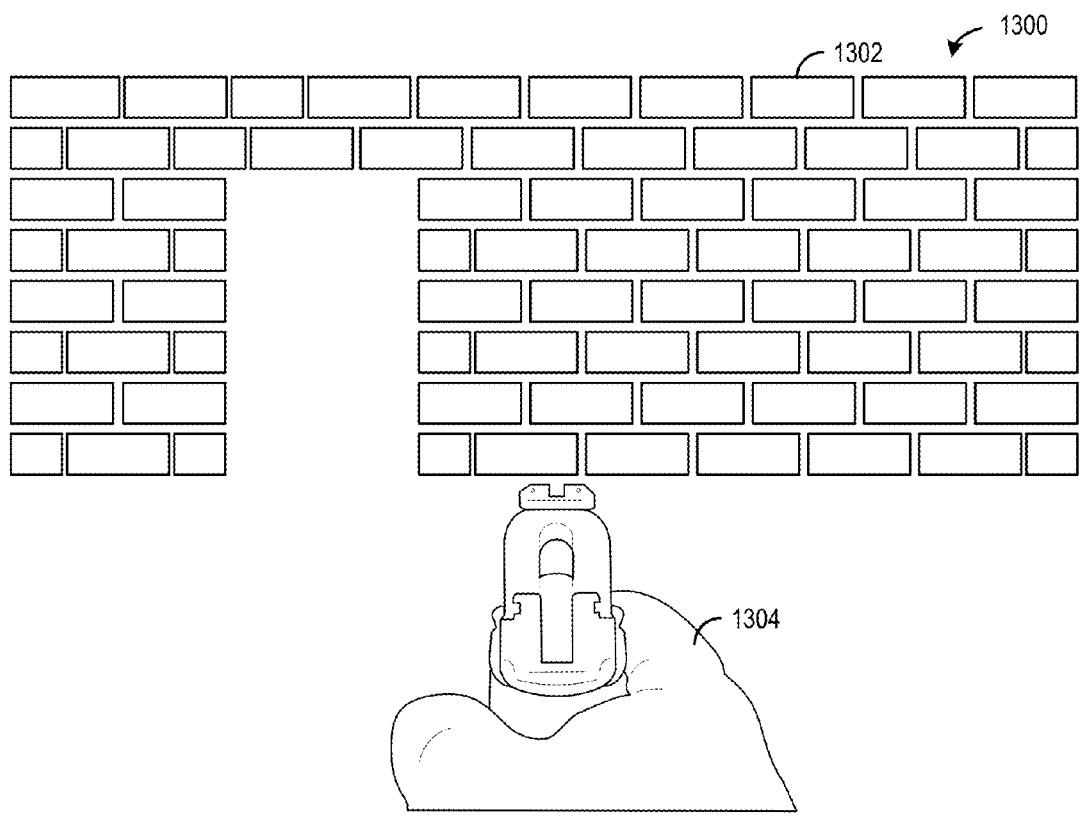
FIGS. 13A and 13B schematically show an example computer environment.

FIG. 13A schematically shows an example computer environment 1300. Computer environment 1300 may be generated by a computing device, such as system 100, system 700, computing system 1000, mobile device 1100, cloud-supported environment 1200, or computing system 1900, running a video game, virtual reality application, or augmented reality application, for example. Computer environment 1300 includes visual elements, such as wall 1302, that may include associated sound blocking, sound absorbing, sound reflecting, or other audio properties. Computer environment further includes a listener 1304 at which audio from a sound emitter (not visible in FIG. 13A) may be received. For example, computer environment 1300 is in the form of a first-person gaming environment, where listener 1304 may be an avatar or game character controlled by a player of the game. The sound emitter (illustrated in FIG. 13B) may be another game character or other element of the computer environment. It is to be understood that the sound emitter is an element of the computer environment having a virtual location.

Figure 13B:
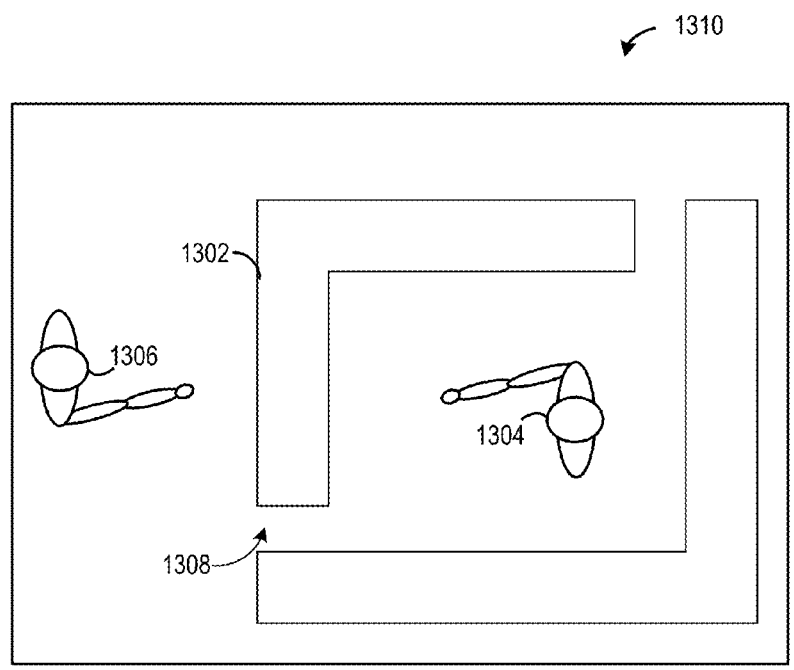

FIG. 13B shows a top-down representation 1310 of computer environment 1300. As appreciated by FIG. 13B, wall 1302 obstructs a direct audio path between the sound emitter 1306 and listener 1304. However, one or more indirect audio paths may be present, such as through opening 1308.

Thus, as will be explained in more detail below, in order to identify one or more audio redirection paths, a plurality of candidate portal points may be identified by generating a voxelized representation of the computer environment and identifying voxels in the voxelized representation that provide a viable audio path to the listener. Once one or more of the candidate voxels have been selected, the selected voxels are passed to an audio processor, where the portal points/voxels may be used to adjust the audio that is output from the location of the sound emitter such that the audio path is perceived by the listener to pass through the portal point(s).

Figure 14:
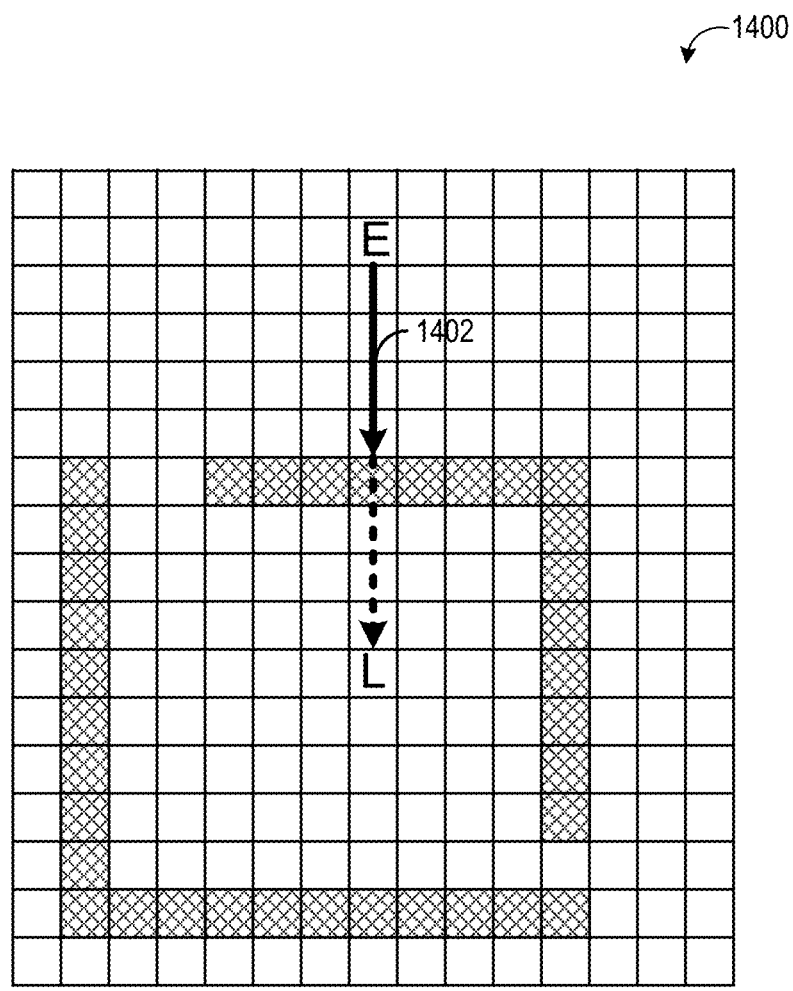
FIGS. 14-16 schematically show example cross-sectional views of a voxelized representation of the computer environment of FIGS. 13A and 13B.

FIG. 14 shows an example cross-section 1400 of a voxelized representation of computer environment 1300. Each square represents a voxel, with voxels that intersect a sound-blocking element of computer environment 1300 being classified as obstructed voxels and shown as hatched squares. The location of the listener is represented by the square marked L while the location of the sound emitter is represented by the square marked E. As appreciated from FIG. 14, the direct path 1402 between the sound emitter E and the listener L is blocked by wall 1302.

Figure 15:
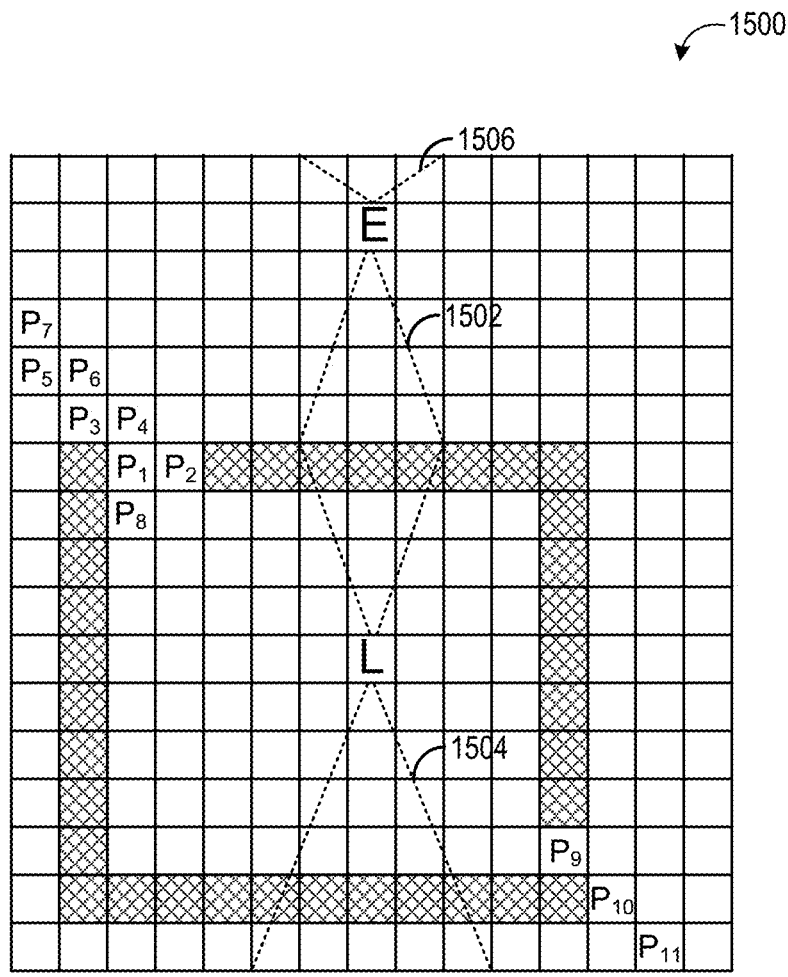

FIG. 15 shows another example cross-section 1500 of the voxelized representation of computer environment 1300 with a plurality of candidate portal points marked. Each voxel that may act as a portal point is marked P. Herein, each voxel that provides an unobstructed, straight-line path to the listener and an unobstructed, straight-line path to the sound emitter may be identified as a portal point (e.g., portal points $P_1$-$P_8$). In other examples, additional voxels that provide an unobstructed path to the listener, but not the emitter, also may be identified as portal points (e.g., portal points $P_9$-$P_{11}$). For example, such portal points may receive reflected sound from the sound emitter if another element is present in the computer environment off which sound may reflect from the emitter back through the portal point to the listener.

Figure 16:
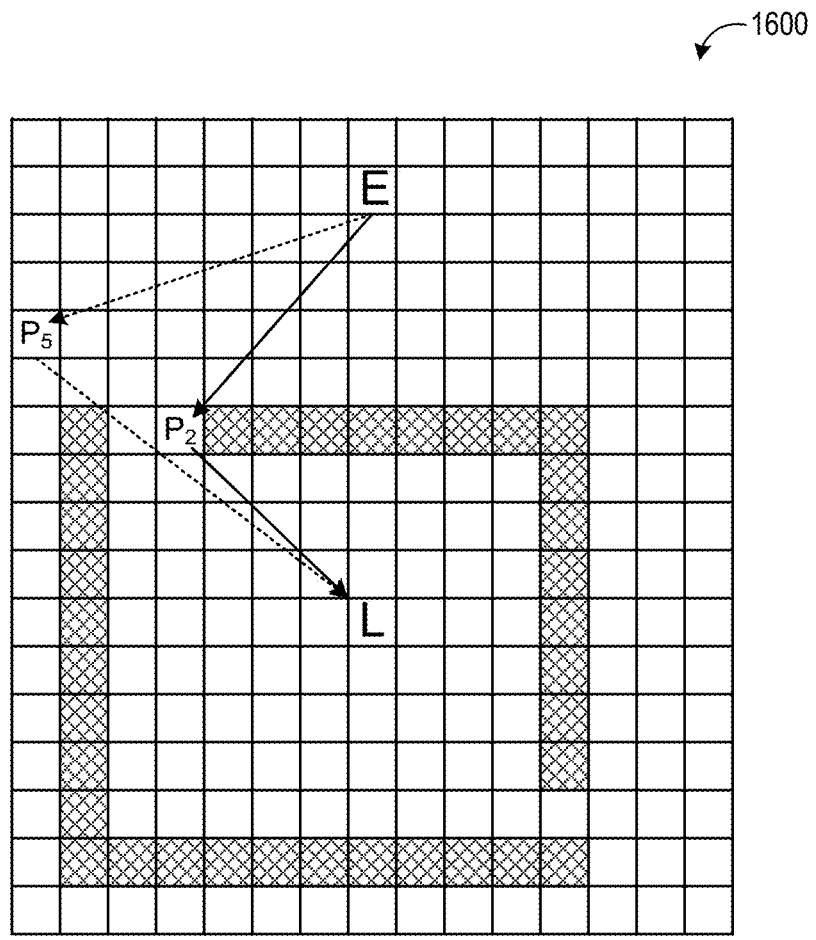

The cross-section views illustrated in FIGS. 14-16 are 2-dimensional cross-sections of the voxelized representation of the computer environment, which may be 3-dimensional. As such, voxels may extend in three dimensions, the portal points may also be present in three dimensions, and audio may be redirected in three-dimensions.

Additionally, one or more exclusion zones may be present. As shown, a first exclusion zone 1502 may be present between the listener and the emitter, and may be in the shape of a bi-cone. A second exclusion zone 1504 may be present behind the listener, and a third exclusion zone 1506 may be present behind the emitter. The exclusion zones may represent areas of the computer environment where it may be undesirable to redirect audio or unlikely sound will be emitted from (e.g., the second and third exclusion zones), or the exclusion zones may represent areas of the computer environment in a direct path between the listener and emitter (e.g., the first exclusion zone). Accordingly, any voxels that fall within the exclusion zones may be omitted from the list of portal points.

The exclusion zones may have any suitable size or shape depending on desired audio redirection. For example, each cone may have a specified angle from the axis to the cone's boundary (e.g., generatrix segment). Further, the exclusion zones described herein have a cone shape, as the voxelized representation is a 3D representation. However, in examples where the representation is a 2D representation, the exclusion zones may be a triangular or other 2-dimensional shape.

Once candidate portal points have been identified, the candidate portal points may be ranked based on a respective distance representative of the path sound from the sound emitter would travel to the listener via a respective portal point. Each portal point is assigned a combined distance calculated by adding a first distance from the emitter to the portal point to a second distance from the portal point to the listener, and the portal points are ranked based on the combined distance (e.g., shortest to longest).

As shown in FIG. 15, the portal points have combined distances ranging from 2.3-4.2 meters, although other units of measurement for the distances are possible (including generic distances based on voxel size). Portal point $P_2$ has the shortest distance. Accordingly, point $P_2$ may be chosen as a selected portal point for audio redirection. Thus, voxel identification information (e.g., voxel address) for the selected portal point may be saved and/or sent to an audio processor, where the audio processor may apply suitable filters, stereo or surround sound channel balancing, and/or other processing so that output audio is adjusted to have a perceived direction that passes through the selected portal point.

In some examples, more than one portal point may be selected for audio redirection. To ensure that discrete audio paths are provided by the multiple portal points, nearby portal points to the selected portal point and/or any portal points that would provide the same perceived audio direction may be excluded from consideration as an additional selected portal point. For example, the portal points neighboring point $P_2$ may be excluded (e.g., points $P_1$, $P_3$, $P_4$, and $P_8$ may be excluded) and/or portal points along the same or similar path as point $P_2$ may be excluded (e.g., point $P_6$). The portal point having the shortest distance of the remaining points ($P_5$ and $P_7$) may then be selected for an additional selected portal point (e.g., point $P_5$). FIG. 16 shows another cross-sectional view 1600 of the voxelized environment, with a redirected audio path via the portal point $P_2$ shown by the solid line, and an optional redirected audio path via the portal point $P_5$ shown by the dashed line. In some implementations, selected portal points may have exclusion zones. As example, selected portal point $P_2$ may have an exclusion zone that would disqualify $P_5$, but which would allow a secondary $P_9$ (FIG. 15) portal point.

Figure 17:
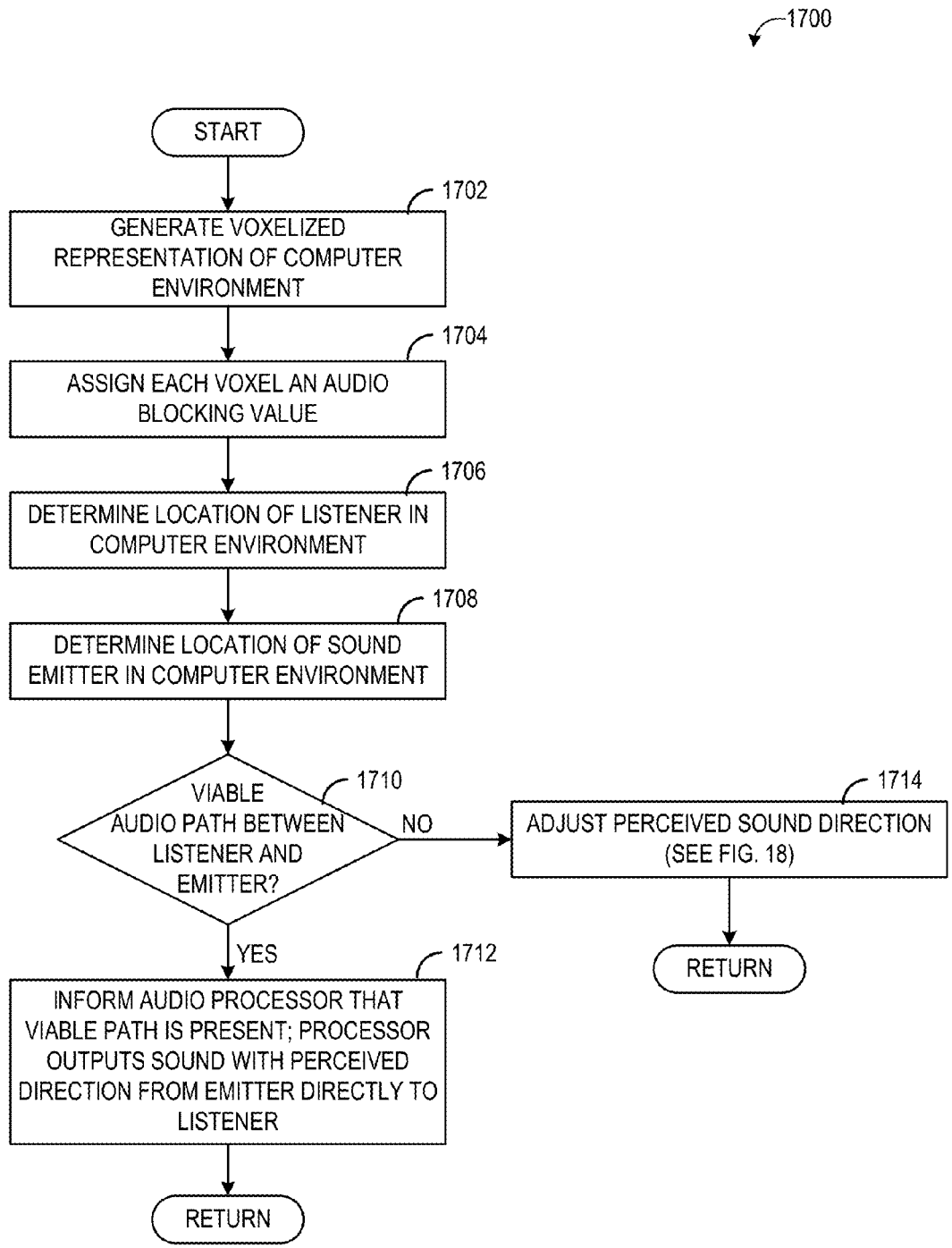
FIGS. 17 and 18 are flow charts illustrating example methods for redirecting a perceived audio direction.

FIG. 17 illustrates a method 1700 for redirecting audio in a computer environment. Method 1700 may be carried out by a computing device, such as adjustment system 100, system 700, computing system 1000, mobile device 1100, cloud-based environment 1200, and/or computing system 1900. At 1702, method 1700 includes generating a voxelized representation of a computer environment. The voxelized representation of the computer environment may be generated as described above with respect to FIGS. 1 and 7. At 1704, method 1700 includes assigning each voxel in the voxelized representation an audio blocking value. The audio blocking values may represent a level of blocking of audio provided by that voxel, based on properties of elements within the computer environment. For example, open space may have a blocking value of zero, while a concrete wall may have a blocking value of one.

At 1706, method 1700 includes determining a location of a listener in the computer environment. The location of the listener may include one or more voxels in the voxelized representation that correspond to a position of the listener within the computer environment. The listener may include an avatar, player in a game, and/or user of the computer environment, and the location of the listener may or may not correspond to a location of a user of the computing device in the real world. At 1708, method 1700 includes determining a location of a sound emitter in the computer environment. The location of the sound emitter may include one or more voxels in the voxelized representation that correspond to a position of the sound emitter within the computer environment. The sound emitter may include another avatar, game player, user, game element, or other suitable sound source, and may or may not represent a location of an actual sound source in the real world environment (e.g., a speaker).

At 1710, method 1700 includes determining if a viable audio path between the listener and the sound emitter is present. A viable audio path may include a direct (e.g., no turns or changes in direction) path along the voxels between the listener and the sound emitter, where each voxel along the direct path has a blocking value that is less than a threshold value. In one example, an audio path between the listener and the sound emitter may be classified as a viable path when each voxel along the path has a blocking value of 0.1 or less, such that substantially none of the sound emitted from the sound emitter is blocked by elements of the computer environment. In other examples, the audio path may be classified as a viable path if at least some of the sound emitted from the sound emitter is not blocked. e.g., if each voxel along the path has a blocking value of 0.5 or less.

If a viable audio path is present between the sound emitter and the listener, method 1700 proceeds to 1712 to inform an audio processor (e.g., the audio mixer described above with respect to FIG. 7) that a viable audio path is present. In one example, the audio processor may proceed to output sound (e.g., via one or more speakers) with suitable filters, channel balancing, delay, etc., such that the sound is perceived at the location of the listener to have been emitted from the sound emitter. If a viable audio path is not present between the sound emitter and the listener, or optionally if a viable path is present but multi-path echo is supported, method 1700 proceeds to 1714 to adjust the perceived sound direction of output audio, which will be explained in more detail below with respect to FIG. 18.

Figure 18:
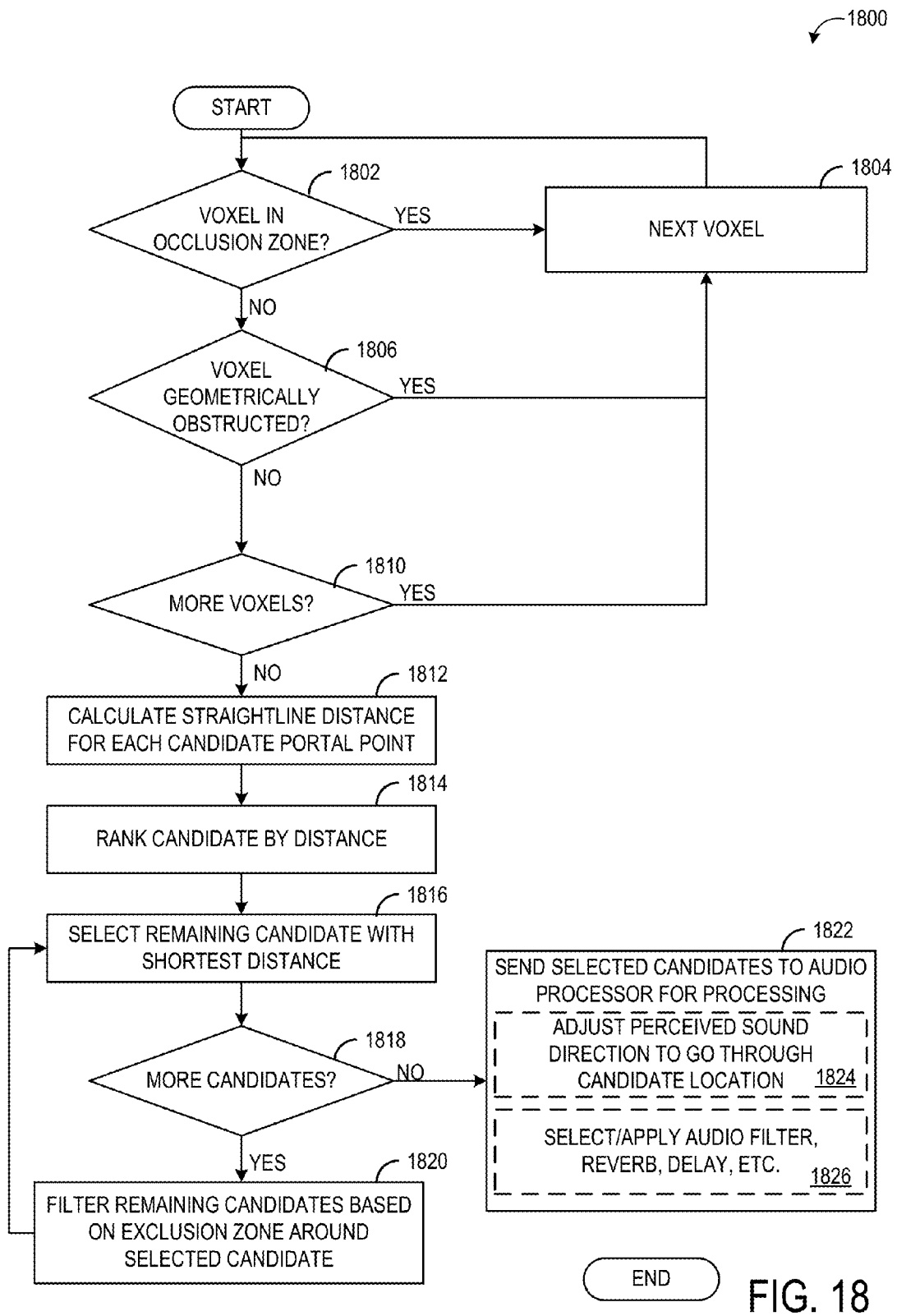

FIG. 18 illustrates a method 1800 for adjusting a perceived direction of output audio based on listener and emitter locations. Method 1800 may be performed as part of method 1700, e.g., in response to an indication that no viable, direct audio path is present between the listener and sound emitter, or optionally to calculate secondary echo paths. At 1802, method 1800 includes determining if a candidate voxel of the voxelized representation of the computer environment is in an exclusion zone. As explained above, the voxelized representation of the computer environment may include exclusion zones behind each of the location of the listener and the location of the sound emitter, as well as an exclusion zone between the location of the listener and the location of the sound emitter. If the candidate voxel is in an exclusion zone, method 1800 proceeds to 1804 to advance to the next voxel in the voxelized representation of the computer environment.

If the candidate voxel is not in an exclusion zone, method 1800 proceeds to 1806 to determine if the candidate voxel is geometrically obstructed from the listener and/or sound emitter. The candidate voxel may be defined as being geometrically obstructed when one or more voxels between the candidate voxel and the location of the listener has a blocking value greater than a threshold (e.g., 0.5 or greater) and/or when one or more voxels between the candidate voxel and the location of the sound emitter has a blocking value greater than a same or different threshold. In some examples, the candidate voxel may be defined as being geometrically obstructed when at least one audio path to and/or from the candidate voxel is blocked. In other examples, both audio paths (e.g., from the emitter to the voxel and from the voxel to the listener) must be blocked for the candidate voxel to be considered geometrically obstructed. In still further examples, even if both audio paths are blocked, the voxel may not be geometrically obstructed if elements are present that may reflect the audio through the candidate voxel. Additionally, if the candidate voxel itself has a blocking value greater than the threshold, the voxel may be considered obstructed.

If the candidate voxel is geometrically obstructed, method 1800 proceeds to 1804 to advance to the next voxel in the voxelized representation of the computer environment. If the candidate voxel is not geometrically obstructed, method 1800 proceeds to 1810 to determine if there are remaining voxels to consider. If there are remaining voxels to be considered, method 1800 proceeds to 1804 to advance to the next voxel in the voxelized representation of the computer environment.

If no voxels remain to be considered, method 1800 proceeds to 1812 to calculate a straight-line distance for each candidate portal point. Each voxel identified by method 1800 as not being in an exclusion zone, and not being geometrically obstructed may be marked as a candidate portal point. Each candidate portal point may be associated with a combined distance that includes the straight-line distance between that portal point and the location of the listener summed with the straight-line distance between that portal point and the location of the sound emitter.

At 1814 method 1800 includes ranking each candidate portal point according to the calculated straight-line combined distance. In one example, the candidate portal points may be ranked from shortest to longest straight-line combined distance. At 1816, method 1800 includes selecting a remaining candidate that is associated with the shortest distance. At 1818, method 1800 includes determining if more candidate portal points remain. If more candidate portal points remain, method 1800 proceeds to 1820 to filter the remaining candidate portal points based on an exclusion zone around the selected portal point. For example, each voxel surrounding/adjacent to the selected portal point may be filtered out of the remaining candidates. After filtering, method 1800 loops back to 1816 to select the remaining candidate having the shortest distance.

When no candidate portal points remain, method 1800 proceeds to 1822 to provide the selected portal point(s) to the audio processor for further processing. The processing at the audio processor may include, as indicated at 1824, adjusting the perceived direction of sound output by the sound emitter to go through the selected portal point (e.g., via stereo or surround sound channel balancing). The processing may additionally or alternatively include, as indicated at 1826, selecting and/or applying one or more filters, delay, reverb, etc., based on the location of the selected portal point.

Thus, the methods described above with respect to FIGS. 17 and 18 provide for generating a voxelized representation of a computer environment, where the computer environment is an environment of a video game, virtual reality application, augmented reality application, or other suitable environment. When a direct audio path between a listener in the computer environment and a sound emitter in the computer environment is blocked by elements of the computer environment, the voxelized representation may be analyzed to identify alternate, indirect paths via which audio from the sound emitter may be redirected. By analyzing the voxelized representation of the computer environment, the computer environment may be dynamically assessed for changes in listener and/or sound emitter location as well as changes to the elements of the computer environment. The methods described herein may be utilized in user-created game environments, or other game environments that have not had 3D sound characteristics and/or routes specifically embedded by the game developer. Further, while the examples described herein relate to a voxelized, two-dimensional representation, it is to be understood similar methods for identifying portal points and audio redirection paths may be applied to three-dimensional representations of the computer environment.

In some embodiments, the methods and processes described herein may be tied to a computing system of one or more computing devices. In particular, such methods and processes may be implemented as a computer-application program or service, an application-programming interface (API), a library, and/or other computer-program product.

Figure 19:
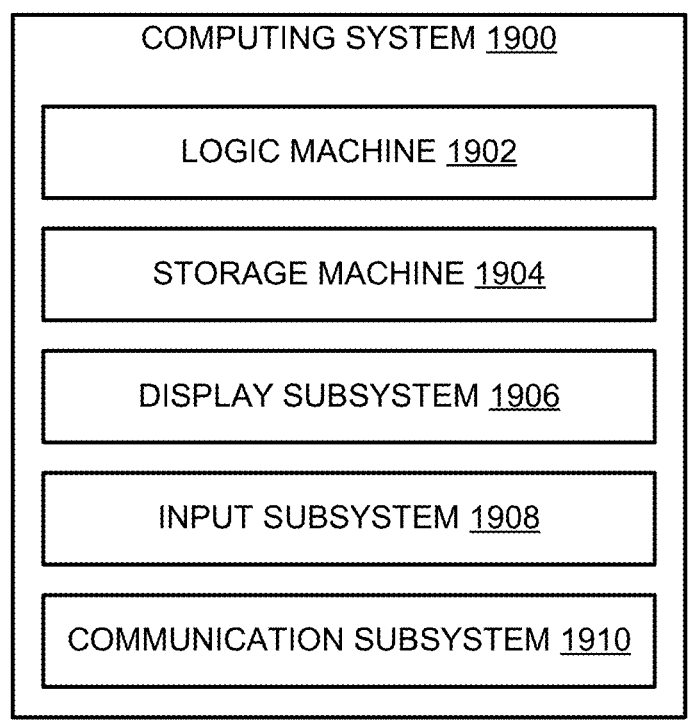
FIG. 19 schematically shows a non-limiting computing system.

FIG. 19 schematically shows a non-limiting embodiment of a computing system 1900 that can enact one or more of the methods and processes described above. Computing system 1900 is shown in simplified form. Computing system 1900 may take the form of one or more personal computers, server computers, tablet computers, home-entertainment computers, network computing devices, gaming devices, mobile computing devices, mobile communication devices (e.g., smart phone), and/or other computing devices. System 100, system 700, computing system 1000, mobile device 1100, and cloud-supported environment 1200 are non-limiting examples of computing system 1900.

Computing system 1900 includes a logic machine 1902 and a storage machine 1904. Computing system 1900 may optionally include a display subsystem 1906, input subsystem 1908, communication subsystem 1910, and/or other components not shown in FIG. 19.

Logic machine 1902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1904 includes one or more physical devices configured to hold instructions executable by the logic machine to implement the methods and processes described herein. When such methods and processes are implemented, the state of storage machine 1904 may be transformed—e.g., to hold different data.

Storage machine 1904 may include removable and/or built-in devices. Storage machine 1904 may include optical memory (e.g., CD, DVD, HD-DVD. Blu-Ray Disc, etc.), semiconductor memory (e.g., RAM. EPROM, EEPROM, etc.), and/or magnetic memory (e.g., hard-disk drive, floppy-disk drive, tape drive, MRAM, etc.), among others. Storage machine 1904 may include volatile, nonvolatile, dynamic, static, read/write, read-only, random-access, sequential-access, location-addressable, file-addressable, and/or content-addressable devices.

It will be appreciated that storage machine 1904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1902 and storage machine 1904 may be integrated together into one or more hardware-logic components. Such hardware-logic components may include field-programmable gate arrays (FPGAs), program- and application-specific integrated circuits (PASIC/ASICs), program- and application-specific standard products (PSSP/

ASSPs), system-on-a-chip (SOC), and complex programmable logic devices (CPLDs), for example.

The terms "module," "program," and "engine" may be used to describe an aspect of computing system 1900 implemented to perform a particular function. In some cases, a module, program, or engine may be instantiated via logic machine 1902 executing instructions held by storage machine 1904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1906 may be used to present a visual representation of data held by storage machine 1904. This visual representation may take the form of a graphical user interface (GUI). As the herein described methods and processes change the data held by the storage machine, and thus transform the state of the storage machine, the state of display subsystem 1906 may likewise be transformed to visually represent changes in the underlying data. Display subsystem 1906 may include one or more display devices utilizing virtually any type of technology. Such display devices may be combined with logic machine 1902 and/or storage machine 1904 in a shared enclosure, or such display devices may be peripheral display devices.

When included, input subsystem 1908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1910 may be configured to communicatively couple computing system 1900 with one or more other computing devices. Communication subsystem 1910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1900 to send and/or receive messages to and/or from other devices via a network such as the Internet.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 10, computer-readable storage media include memory 1020 and 1025, and storage 1040. By way of example and with reference to FIG. 11, computer-readable storage media include memory and storage 1120, 1122, and 1124. By way of example and with reference to FIG. 19, computer-readable storage media include storage machine 1904. The term computer-readable storage media does not include signals and carrier waves. In addition, the term computer-readable storage media does not include communication connections (e.g., 1070, 1160, 1162, and 1164).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure. Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Another example provides a method for providing directional audio in a computer environment. The method includes recognizing a location of a listener in the computer environment; recognizing a location of a sound emitter in the computer environment; recognizing a plurality of candidate portal points in the computer environment, each candidate portal point providing a viable audio path from the location of the sound emitter to the location of the listener; identifying a selected portal point from among the plurality of candidate portal points based at least on a first distance from the selected portal point to the location of the listener and a second distance from the selected portal point to the location of the sound emitter; and setting a perceived direction of the sound emitter to go through a location of the selected portal point. In such an example, the method may additionally or alternatively include generating a voxel-based representation of the computer environment, the voxel-based representation comprising a plurality of voxels, the location of the listener comprising one or more voxels of the plurality of voxels, the location of the sound emitter comprising one or more voxels of the plurality of voxels. In such an example, the method may additionally or alternatively include assigning each voxel of the plurality of voxels a blocking value based on properties of one or more elements of the computer environment. In such an example, recognizing the plurality of candidate portal points in the computer environment may additionally or alternatively include identifying each voxel that has blocking value lower than a threshold value, is not geometrically obstructed from the location of the listener or the location of the sound emitter, and is not located within an exclusion zone. In such an example, identifying each voxel that is not located within an exclusion zone may additionally or alternatively include identifying each voxel that is not located within a first exclusion zone positioned behind the location of the listener, a second exclusion zone positioned behind the location of the sound emitter, and a third exclusion zone positioned between the location of the listener and the location of the sound emitter. In such an example, identifying the selected portal point may additionally or alternatively include identifying a selected portal point that has a shortest combined first distance and second distance. In such an example, recognizing the plurality of candidate portal points in the computer environment is additionally or alternatively performed responsive to identifying that a direct audio path between the location of the listener and the location of the sound emitter is blocked. Any or all of the above-described examples may be combined in any suitable manner in various implementations.

Another example provides for a method for providing directional audio in a computer environment. The method includes determining a location of a listener in the computer environment; determining a location of a sound emitter in the computer environment; identifying that a direct audio path between the location of the listener and the location of the sound emitter is blocked; based at least on the identification, recognizing a plurality of candidate portal points each providing a viable audio path to the listener; ranking each candidate portal point based at least on a respective combined distance from a location of that portal point to the location of the listener and from the location of that portal point to the location of the sound emitter; identifying a selected portal point from among the ranked candidate portal points having the shortest combined distance, and determining if the selected portal point is located in an exclusion zone; when the selected portal point is not located in the exclusion zone, setting a perceived direction of sound emitted from the sound emitter to go through the location of the selected portal point; and outputting sound from the sound emitter via the perceived direction. In such an example, the method may additionally or alternatively include generating a voxel-based representation of the computer environment, the voxel-based representation comprising a plurality of voxels, the location of the listener comprising one or more voxels of the plurality of voxels, the location of the sound emitter comprising one or more voxels of the plurality of voxels. In such an example, the method may additionally or alternatively include designating each voxel of the plurality of voxels that intersect an element of the computer environment as blocked voxels, and identifying that the direct audio path between the location of the listener and the location of the sound emitter is blocked may additionally or alternatively include identifying that a blocked voxel is present between the one or more voxels comprising the location of the listener and the one or more voxels comprising the location of the sound emitter. In such an example, the method may additionally or alternatively include assigning each voxel of the plurality of voxels a blocking value representing a level of audio obstruction provided by the element of the computer environment intersecting that voxel, and recognizing the plurality of candidate portal points each providing a viable audio path to the listener additionally or alternatively may include identifying each voxel of the plurality of voxels that has a blocking value less than a threshold blocking value. In such an example, the method may additionally or alternatively include when the selected portal point is located in an exclusion zone, selecting a subsequent portal point that has a next-shortest combined distance, determining if the subsequent portal point is located in an exclusion zone, and setting the perceived direction of sound emitted from the sound emitter through the location of the subsequent portal point when the subsequent portal point is not located in an exclusion zone. In such an example, determining if the selected portal point is located in an exclusion zone additionally or alternatively may include determining if the selected portal point is located within a first exclusion zone positioned behind the location of the listener, a second exclusion zone positioned behind the location of the sound emitter, or a third exclusion zone positioned between the location of the listener and the location of the sound emitter. In such an example, the method may additionally or alternatively include after identifying the selected portal point, filtering remaining candidate portal points based on a direction of a straight-line path between the selected portal point and the location of the listener. Any or all of the above-described examples may be combined in any suitable manner in various implementations.

Another example provides for a computing system including a logic machine and a storage machine holding instructions executable by the logic machine to recognize a location of a listener in a computer environment; recognize a location of a sound emitter in the computer environment; recognize a plurality of candidate portal points in the computer environment, each candidate portal point providing a viable audio path from the location of the sound emitter to the location of the listener; identify a selected portal point from among the plurality of candidate portal points based at least on a first distance from the selected portal point to the location of the listener and a second distance from the selected portal point to the location of the sound emitter; and set a perceived direction of the sound emitter to go through a location of the selected portal point. In such an example, the instructions may be additionally or alternatively further executable to generate a voxel-based representation of the computer environment, the voxel-based representation comprising a plurality of voxels, the location of the listener comprising one or more voxels of the plurality of voxels, the location of the sound emitter comprising one or more voxels of the plurality of voxels. In such an example, the instructions may be additionally or alternatively further executable to assign each voxel of the plurality of voxels a blocking value based on material properties of one or more elements of the computer environment. In such an example, the instructions to recognize the plurality of candidate portal points in the computer environment may additionally or alternatively include instructions executable to identify each voxel that has a blocking value lower than a threshold value, is not geometrically obstructed from the location of the listener or the location of the sound emitter, and is not located within an exclusion zone. In such an example, to identify each voxel that is not located within an exclusion zone the instructions may be additionally or alternatively executable to identify each voxel that is not located within a first exclusion zone positioned behind the location of the listener, a second exclusion zone positioned behind the location of the sound emitter, and a third exclusion zone positioned between the location of the listener and the location of the sound emitter. In such an example, the instructions to identify the selected portal point may additionally or alternatively include instructions to identify a selected portal point that has a shortest combined first distance and second distance. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for providing directional audio in a virtual computer environment, comprising:
   recognizing a location of a listener in the virtual computer environment;
   recognizing a location of a sound emitter in the virtual computer environment;
   defining a first exclusion zone extending continuously behind the location of the listener and opposite the location of the emitter, and a second exclusion zone extending continuously behind the location of the emitter and opposite the listener;
   recognizing a plurality of candidate portal points in the virtual computer environment, outside of the first and second exclusion zones, each candidate portal point providing a viable audio path from the location of the sound emitter to the location of the listener;
   identifying a selected portal point from among the plurality of candidate portal points based at least on a first distance from the selected portal point to the location of the listener and a second distance from the selected portal point to the location of the sound emitter; and
   setting a perceived direction of the sound emitter to go through a location of the selected portal point; and
   outputting directional audio consistent with the perceived direction.

2. The method of claim 1, further comprising generating a voxel-based representation of the virtual computer environment, the voxel-based representation comprising a plurality of voxels, the location of the listener comprising one or more voxels of the plurality of voxels, the location of the sound emitter comprising one or more voxels of the plurality of voxels.

3. The method of claim 2, further comprising assigning each voxel of the plurality of voxels a variable blocking value based on properties of one or more elements of the virtual computer environment.

4. The method of claim 3, wherein recognizing the plurality of candidate portal points in the virtual computer environment comprises identifying each voxel that has blocking value lower than a threshold value, is not geometrically obstructed from the location of the listener or the location of the sound emitter, and is not located within an exclusion zone.

5. The method of claim 4, wherein identifying each voxel that is not located within an exclusion zone comprises identifying each voxel that is not located within a third exclusion zone positioned in an unobstructed area between the location of the listener and the location of the sound emitter.

6. The method of claim 1, wherein identifying the selected portal point comprises identifying a selected portal point that has a shortest combined first distance and second distance.

7. The method of claim 1, wherein recognizing the plurality of candidate portal points in the computer environment is performed responsive to identifying that a direct audio path between the location of the listener and the location of the sound emitter is blocked.

8. A method for providing directional audio in a virtual computer environment, comprising:
   determining a location of a listener in the computer environment;
   determining a location of a sound emitter in the computer environment;
   identifying that a direct audio path between the location of the listener and the location of the sound emitter is blocked;
   pursuant to identifying that the direct audio path between the location of the listener and the location of the sound emitter is blocked, recognizing a plurality of candidate portal points each providing a viable audio path to the listener;
   ranking each candidate portal point based at least on a respective combined distance from a location of that portal point to the location of the listener and from the location of that portal point to the location of the sound emitter;
   identifying a selected portal point from among the ranked candidate portal points having the shortest combined distance, and determining if the selected portal point is located in an exclusion zone;
   when the selected portal point is not located in the exclusion zone, setting a perceived direction of sound emitted from the sound emitter to go through the location of the selected portal point; and
   outputting directional audio consistent with the perceived direction.

9. The method of claim 8, further comprising generating a voxel-based representation of the computer environment, the voxel-based representation comprising a plurality of voxels, the location of the listener comprising one or more voxels of the plurality of voxels, the location of the sound emitter comprising one or more voxels of the plurality of voxels.

10. The method of claim 9, further comprising designating each voxel of the plurality of voxels that intersect an element of the computer environment as blocked voxels, and wherein identifying that the direct audio path between the location of the listener and the location of the sound emitter is blocked comprises identifying that a blocked voxel is present between the one or more voxels comprising the location of the listener and the one or more voxels comprising the location of the sound emitter.

11. The method of claim 10, further comprising assigning each voxel of the plurality of voxels a blocking value representing a level of audio obstruction provided by the element of the computer environment intersecting that voxel, and wherein recognizing the plurality of candidate portal points each providing a viable audio path to the listener comprises identifying each voxel of the plurality of voxels that has a blocking value less than a threshold blocking value.

12. The method of claim 8, further comprising when the selected portal point is located in an exclusion zone, selecting a subsequent portal point that has a next-shortest combined distance, determining if the subsequent portal point is located in an exclusion zone, and setting the perceived direction of sound emitted from the sound emitter through the location of the subsequent portal point when the subsequent portal point is not located in an exclusion zone.

13. The method of claim 8, wherein determining if the selected portal point is located in an exclusion zone comprises determining if the selected portal point is located within a first exclusion zone positioned behind the location of the listener, a second exclusion zone positioned behind the location of the sound emitter, or a third exclusion zone positioned between the location of the listener and the location of the sound emitter.

14. The method of claim 8, further comprising after identifying the selected portal point, filtering remaining candidate portal points based on a direction of a straight-line path between the selected portal point and the location of the listener.

15. A computing system, comprising:
a logic machine; and
storage machine holding instructions executable by the logic machine to:
recognize a location of a listener in a virtual computer environment;
recognize a location of a sound emitter in the virtual computer environment;
define a first exclusion zone extending continuously behind the location of the listener and opposite the location of the emitter, and a second exclusion zone extending continuously behind the location of the emitter and opposite the listener;
recognize a plurality of candidate portal points in the virtual computer environment, outside of the first and second exclusion zones, each candidate portal point providing a viable audio path from the location of the sound emitter to the location of the listener;
identify a selected portal point from among the plurality of candidate portal points based at least on a first distance from the selected portal point to the location of the listener and a second distance from the selected portal point to the location of the sound emitter;
set a perceived direction of the sound emitter to go through a location of the selected portal point; and
output directional audio consistent with the perceived direction.

16. The computing system of claim 15, wherein the instructions are further executable to generate a voxel-based representation of the computer environment, the voxel-based representation comprising a plurality of voxels, the location of the listener comprising one or more voxels of the plurality of voxels, the location of the sound emitter comprising one or more voxels of the plurality of voxels.

17. The computing system of claim 16, wherein the instructions are further executable to assign each voxel of the plurality of voxels a blocking value based on material properties of one or more elements of the computer environment.

18. The computing system of claim 17, wherein the instructions to recognize the plurality of candidate portal points in the computer environment comprises instructions executable to identify each voxel that has a blocking value lower than a threshold value, is not geometrically obstructed from the location of the listener or the location of the sound emitter, and is not located within an exclusion zone.

19. The computing system of claim 18, wherein to identify each voxel that is not located within an exclusion zone the instructions are executable to identify each voxel that is not located within third exclusion zone positioned in an unobstructed area between the location of the listener and the location of the sound emitter.

20. The computing system of claim 15, wherein the instructions to identify the selected portal point comprise instructions to identify a selected portal point that has a shortest combined first distance and second distance.

* * * * *